(12) United States Patent
Tatsukami et al.

(10) Patent No.: US 7,948,752 B2
(45) Date of Patent: May 24, 2011

(54) ELECTRONIC DEVICE

(75) Inventors: Ikki Tatsukami, Kawasaki (JP); Hideki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/219,077

(22) Filed: Jul. 15, 2008

(65) Prior Publication Data
US 2009/0040708 A1 Feb. 12, 2009

(30) Foreign Application Priority Data

Aug. 9, 2007 (JP) ................................ 2007-208615

(51) Int. Cl.
*G06F 1/16* (2006.01)
(52) U.S. Cl. .......... 361/679.58; 361/679.23; 361/679.27; 348/207.1; 348/373; 348/374
(58) Field of Classification Search .............. 361/679.23
See application file for complete search history.

(56) References Cited

U.S. PATENT DOCUMENTS

| | | | | |
|---|---|---|---|---|
| 5,768,163 A * | 6/1998 | Smith, II | ...................... | 708/105 |
| 5,880,928 A * | 3/1999 | Ma | ........................... | 361/679.27 |
| 6,118,653 A * | 9/2000 | Kim | ........................ | 361/679.23 |
| 6,417,884 B1 * | 7/2002 | Chang et al. | .................. | 348/373 |
| 6,717,801 B1 * | 4/2004 | Castell et al. | ............. | 361/679.41 |
| 6,847,520 B2 * | 1/2005 | Hashimoto | .............. | 361/679.01 |
| 7,019,784 B1 * | 3/2006 | Shibuya et al. | ............... | 348/373 |
| 7,256,987 B2 * | 8/2007 | Weng | ........................ | 361/679.55 |
| 7,274,562 B2 * | 9/2007 | Nakajima et al. | ........ | 361/679.55 |
| 7,403,377 B2 * | 7/2008 | Deluga | .................... | 361/679.55 |
| 7,453,688 B2 * | 11/2008 | Wu et al. | .................. | 361/679.55 |
| 7,570,485 B2 * | 8/2009 | Krah | ........................ | 361/679.23 |
| 7,596,832 B2 * | 10/2009 | Hsieh et al. | ...................... | 16/342 |
| 7,611,294 B2 * | 11/2009 | Shi et al. | ........................ | 396/428 |
| 7,636,236 B1 * | 12/2009 | Nana | ........................ | 361/679.26 |
| 2005/0168924 A1 * | 8/2005 | Wu et al. | ....................... | 361/683 |
| 2005/0276009 A1 * | 12/2005 | Kim | ................................ | 361/683 |
| 2006/0152894 A1 * | 7/2006 | Moengen | ..................... | 361/681 |
| 2006/0158839 A1 * | 7/2006 | Deluga | ......................... | 361/683 |
| 2007/0242421 A1 * | 10/2007 | Goschin et al. | ............. | 361/681 |
| 2008/0013262 A1 * | 1/2008 | Stanford et al. | ............. | 361/680 |
| 2008/0117581 A1 * | 5/2008 | Kuo et al. | .................... | 361/683 |
| 2009/0040708 A1 * | 2/2009 | Tatsukami et al. | ........... | 361/683 |

FOREIGN PATENT DOCUMENTS

| | | |
|---|---|---|
| EP | 0969353 A2 | 1/2000 |
| JP | 2000-020164 | 1/2000 |
| JP | 2002-055735 | 2/2002 |

* cited by examiner

*Primary Examiner* — Lisa Lea-Edmonds
*Assistant Examiner* — Anthony Q Edwards
(74) *Attorney, Agent, or Firm* — Fujitsu Patent Center

(57) ABSTRACT

An electronic device has a first cabinet and a second cabinet. The second cabinet has a locking module including a hook, an operation member and a linking mechanism. The hook is formed at a position near a top end of the second cabinet around the center in the lateral direction in opened state, and is engaged with the first cabinet to lock the second cabinet in the closed state. The operation member disengages the hook from the first cabinet in response to operation. The linking mechanism links the operation to movement of disengaging the hook. The second cabinet further has a board mounted with a camera module having an image taking lens and an imaging device and a signal processing circuit for the camera module. The board is disposed at such a position that a portion in which the signal processing circuit is mounted overlaps with the linking mechanism.

8 Claims, 36 Drawing Sheets

ELECTRONIC DEVICE

BACKGROUND OF THE INVENTION

1. Field of the Invention

The present invention relates to an electronic device having a first cabinet and a second cabinet that is supported via a pivot of the first cabinet so as to be opened and closed.

2. Description of the Related Art

A notebook personal computer (hereafter referred to as note PC) is formed by a main unit (a first cabinet) provided with a keyboard on a top surface thereof and a display unit (a second cabinet) provided with a display screen that can be opened and closed with respect to the main unit. Recently, such a note PC equipped with a camera at a position near the top edge of the display unit has started to become popular. The camera is intended for photographing a user's face and using the photographed image for communication via TV, telephone and the like.

Further, a note PC is usually provided with locking mechanism that prevents the closed note PC from being unintentionally opened when the display unit is laid closed on the main unit. Examples of locking function include a hook disposed near the top edge of the display unit and an engaging hole formed in the main unit that receives the hook when the display unit is laid closed on the main unit.

As portability is a requisite for a note PC, it is often the case that the note PC, while being carried, falls by being opened carelessly or hits an object. Accordingly, locking mechanism is provided to prevent unintentional disengagement of the display unit from the main unit.

Here, it is preferable to dispose locking mechanism in approximately the center on side-to-side surface of the note PC for keeping balance of the note PC. The camera should also be disposed in around the center on the side-to-side surface so that when a user faces the front of the note PC the user's face directed to the display screen in the correct posture can be positioned around the center of field angle.

However, a camera is usually fixed to a board mounted with signal processing circuits for the camera and locking mechanism is a locking module that includes, other than a locking hook, an operation member for disengaging the hook from the engaging hole, a linking mechanism linking operation of the operation member to disengaging movement of the hook. In addition, both the board for fixing the camera and the locking mechanism are not little in dimension. Thus, it is difficult to dispose the camera near the locking mechanism.

Accordingly, when both the camera and the locking mechanism are installed in the note PC, either of the camera and the locking mechanism, due to insufficient space, should be placed close to the right or left side off the center of the top edge of the display unit, which is not favorable placement.

Further, this problem is not limited to the note PC and is common to an electronic device with two cabinets that are configured to be opened and closed with respect to each other such as a PDA and a DVD.

In this regard, Japanese Patent Application Publication No. 2000-20164 discloses a camera disposed at around the center, but a locking claw disclosed therein is disposed at a position close to the left side. Japanese Patent Application Publication No. 2002-55735 discloses a camera disposed at a position close to the right side and a locking claw disposed at a position close to the left side, both of which are disposed off the center.

SUMMARY OF THE INVENTION

In view of the above circumstances, the present invention provides an electronic device with a first cabinet and a second cabinet that can be opened and closed with respect to the first cabinet in which a camera and a locking mechanism are disposed close to each other.

An electronic device according to the present invention includes:

a first cabinet; and a second cabinet that is supported via a pivot of the first cabinet and is capable of being closed in a closed state in which the second cabinet is closed to overlap with the first cabinet and is capable of being opened in an opened state in which the second cabinet is opened disengaged from the first cabinet, wherein the second cabinet comprises a locking module including a hook, an operation member and a linking mechanism, the hook being provided at a position near a top end of the second cabinet around the center in the lateral direction of the top end when the second cabinet is opened, the hook being engaged with the first cabinet to lock the second cabinet in the closed state, the operation member disengaging the hook from the first cabinet in response to operation, the linking mechanism linking the operation of the operation member to movement of disengaging the hook, and the second cabinet further comprises a board mounted with a camera module having an image taking lens and an imaging device and a signal processing circuit for the camera module, the board being disposed at such a position that a portion in which the signal processing circuit is mounted overlaps with the linking mechanism.

Usually, a portion of the substrate for a camera in which a camera module is fixed requires considerable thickness for mounting a lens, an imaging device and the like. However, a portion of the substrate in which a signal processing circuit is mounted does not require a thickness much less than that of the portion for the camera module as signal processing circuit are mounted with small and short circuit elements.

The present invention, focusing on the point, disposes the board at such a position that a portion in which the signal processing circuit is mounted overlaps with the linking mechanism forming the locking module. Accordingly, it is possible to dispose the hook for locking and the camera module at positions close to each other.

Here, in the electronic device according to the invention, it is preferable that the operation member protrudes from a top end surface of the second cabinet in the opened state and is operated in response to disengaging locking of the second cabinet in the closed state, the hook protrudes from a surface, which faces the first cabinet, of the second cabinet, and the first cabinet has an engagement hole where the hook enters in the closed state.

The hook and operation member forming the locking module are usually placed in the manner described above.

In addition, the second cabinet may have a photographing window from which the camera module appears at a position beside the hook.

According to the present invention, as the camera module can be placed close to the hook, the photographing window can be arranged at a position beside the hook.

Additionally, a surface, on the side overlapping with the board, of the linking mechanism may be covered with a metal sheet.

A board for a camera is usually mounted with a heat-generating component for signal processing. In that case, if the surface of the linking mechanism overlapping with the board is covered with a metal sheet, it is possible to disperse heat from the heat-generating component. In addition, the metal sheet is capable of serving as an electromagnetic shield and thus suppressing malfunction of the signal processing circuit.

Further, it is preferable that the metal sheet is bent to extend over the surface on the side overlapping with the board and another surface next to and perpendicular to the surface.

If the bent metal sheet is used, strength of the linking mechanism and its neighborhood is increased, which makes the electronic device thinner than a resin part having the same degree of strength.

Preferably, the second cabinet is a cabinet of a display unit in which a display panel with a display screen for displaying information is incorporated with the display screen exposed, and the locking module and the board are disposed in a position above a top end of the display panel in the opened state of the second cabinet.

Usually, a camera module should be placed at an upper position in a state in which the electronic device is opened and a locking module should also be disposed at an upper position that is away form the hinge for opening and closing the cabinet in a state in which the electronic device is opened.

Preferably, the first cabinet is a cabinet of an arithmetic processing unit that incorporates an arithmetic circuit performing arithmetic processing and has a keyboard on a top surface thereof that inputs instructions according to operations.

Accordingly, the present invention can be preferably applied to a note PC.

As described above, the present invention can realize an electronic device in which a camera and a locking mechanism are disposed close to each other.

DETAILED DESCRIPTION OF THE INVENTION

An embodiment of the present invention will be described below. The following description will be given of a notebook PC, which is an example of the electronic device of the present invention.

(General Configuration)

Figure 1:
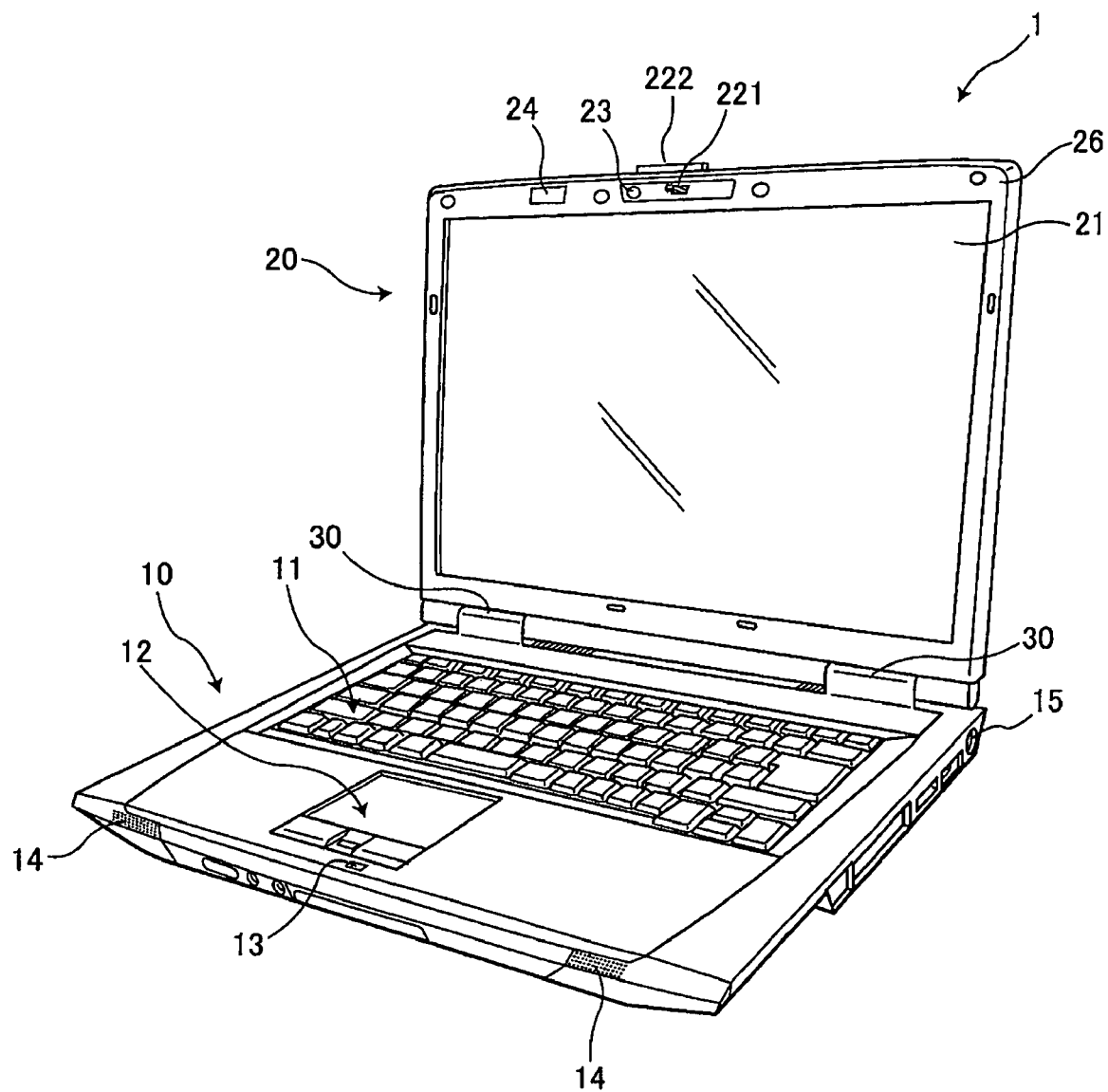
FIG. 1 is a perspective view showing the appearance of a notebook PC in an open condition.
Figure 2:
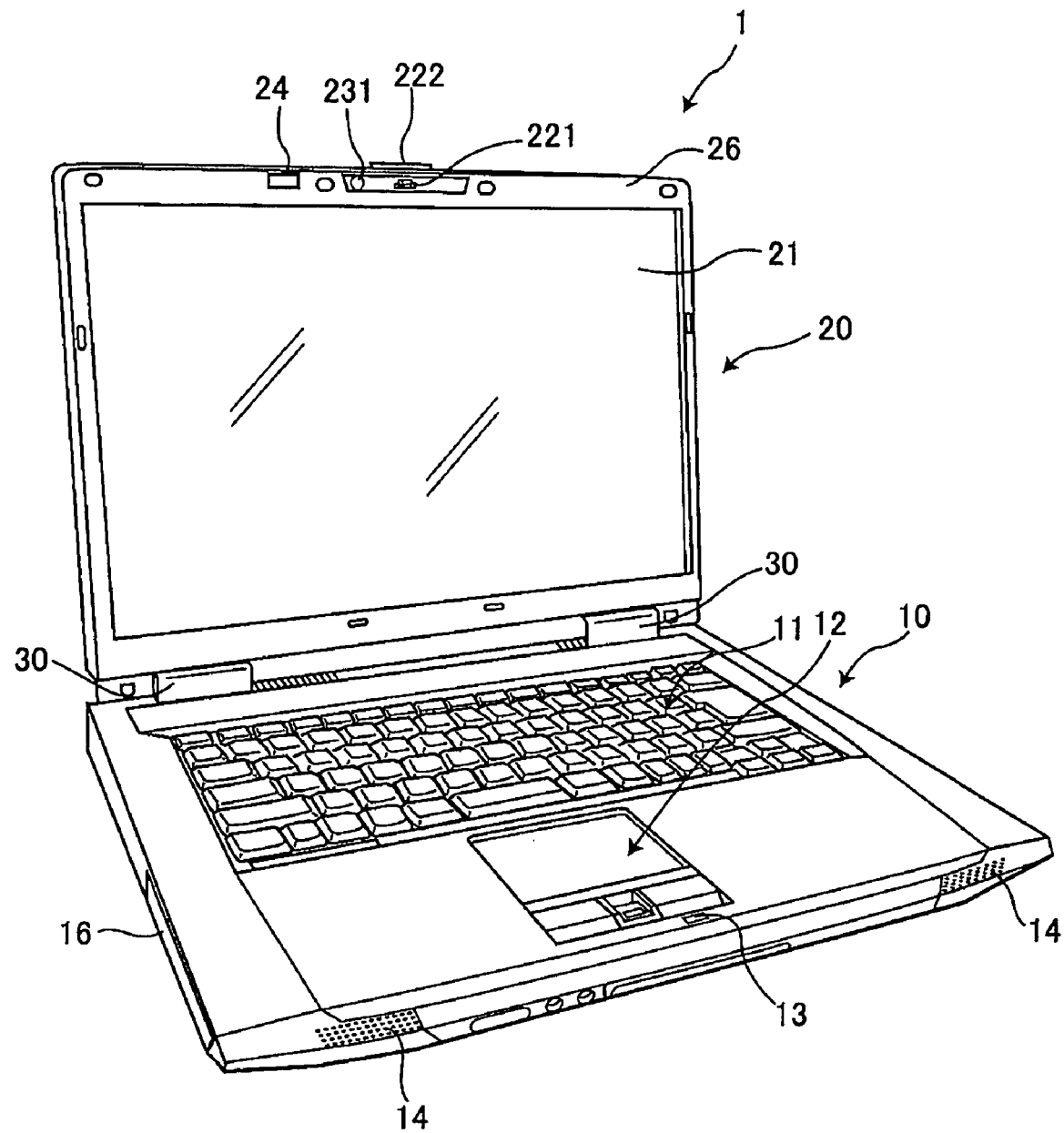
FIG. 2 is a perspective view showing the appearance of the notebook PC in an open condition.
Figure 3:
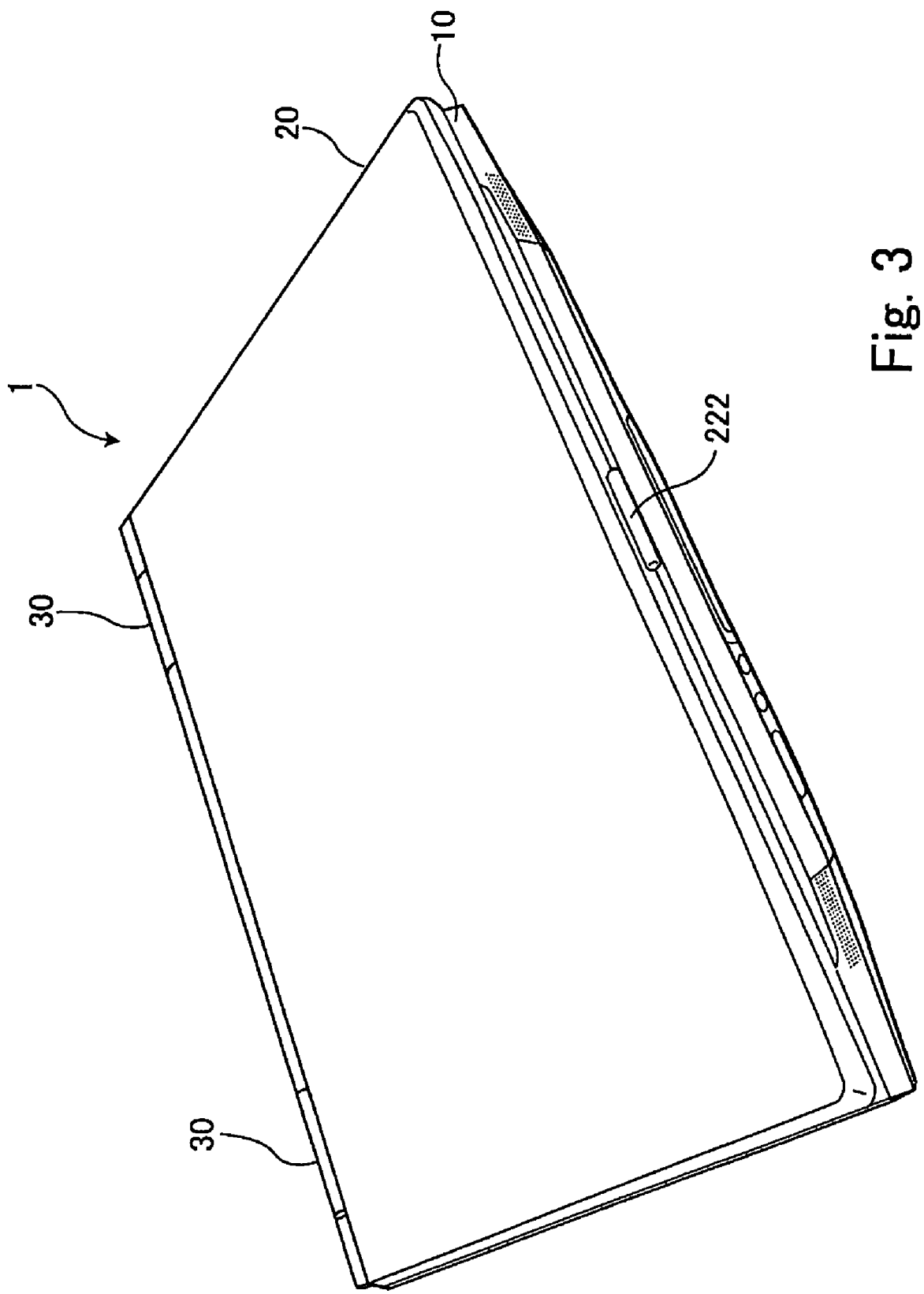
FIG. 3 is a perspective view showing the notebook PC in a closed condition.
Figure 4:
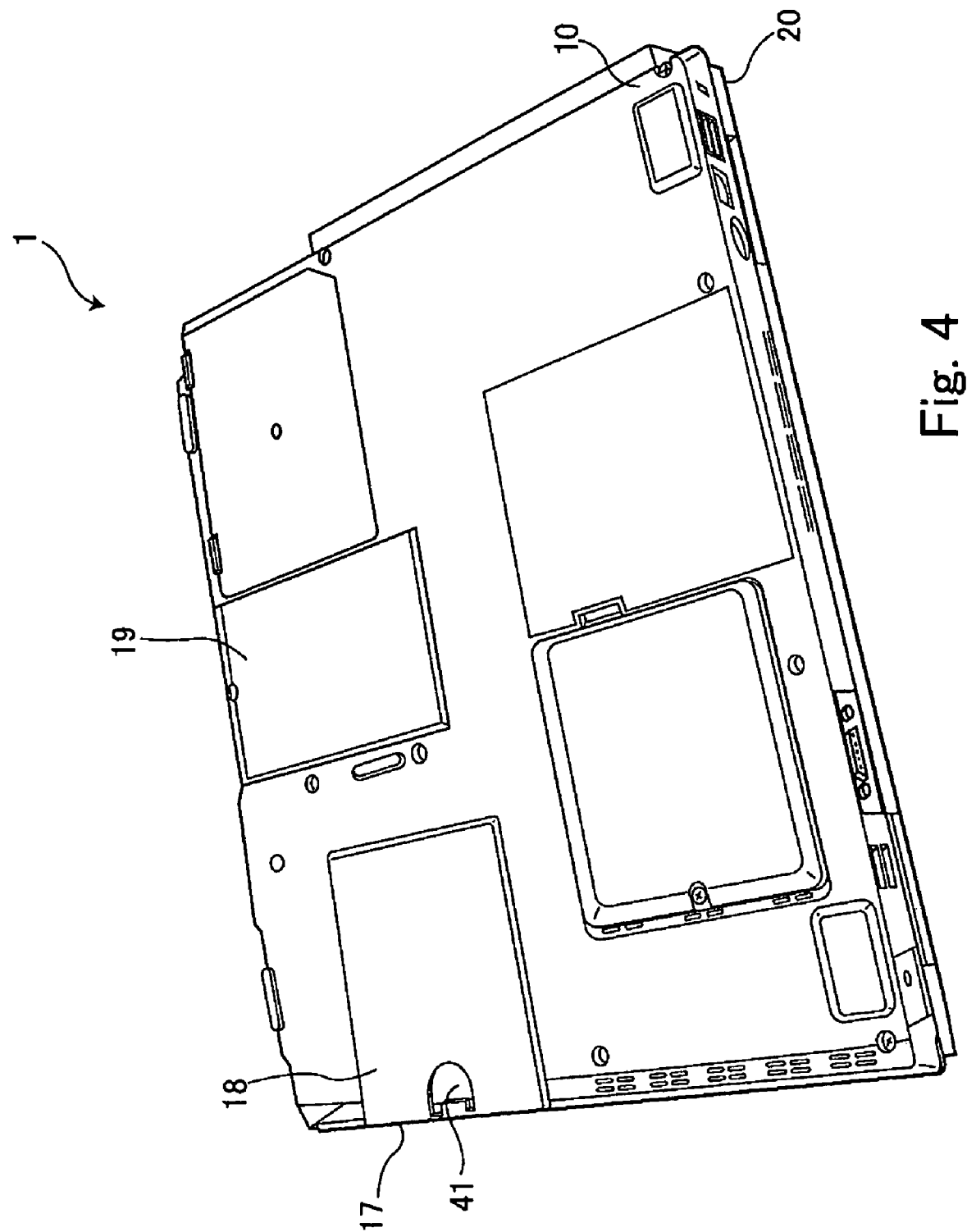
FIG. 4 is a perspective view showing the bottom surface side of the notebook PC in a closed condition.

FIGS. 1 and 2 are perspective views of the appearance of a notebook PC, showing an open condition as viewed from different directions. FIG. 3 is a perspective view showing the notebook PC in a closed condition. And FIG. 4 is a perspective view showing the bottom surface side of the notebook PC in a closed condition.

This notebook PC 1 is composed of a main unit 10 and a display unit 20, and the display unit 20 is connected so as to be able to open and close between a closed condition in which the display unit 20 is superposed on the main unit 10 (see FIG. 3) and an open condition in which the display unit 20 is opened from the main unit 10 by a hinge portion 30 (see FIGS. 1 and 2).

The main unit 10 is provided, on the top surface thereof, with a keyboard 11 for inputting instructions responding to operations, a track pad 12 which is one kind of a pointing device that indicates any point on a display screen 21, which will be described later, in response to operations, and an engaging hole 13 that a locking hook 221 enters.

On the right and left front parts of this main unit 10, sound releasing ports 14 that output sound from a built-in speaker to the outside are formed a little obliquely upward.

Furthermore, on the right side surface of this main unit 10, as shown in FIG. 1, a power supply input terminal 15 for external power supply connection and other multiple connectors and the like are arranged and on the left side surface, as shown in FIG. 2, there is exposed a surface of a CD/DVD drive unit 16, which drives a loaded medium such as a CD and a DVD. In a position in superposed relation with this CD/DVD drive unit 16 on the left side surface in the thickness direction, there is formed a card slot into which a B-CAS card (a BS-conditional access systems card) is to be inserted, which is not illustrated here (which will be described later).

A CPU and many other electronic parts are built in this main unit 10, and various kinds of arithmetic processing are performed by executing programs.

The display unit 20 has, on the front surface thereof, a display screen 21 for information display that constitutes a display panel, and the periphery of the display screen 21 is covered with a front frame 26. A hook 221 for locking protrudes from the front frame 26 in a position above a top edge of the display screen 21 of the front of the display unit 20. This hook 221 enters the engaging hole 13 on the top surface of the main unit 10 when the display unit 20 is closed on the main unit 10, and is locked within the engaging hole 13 so that the display unit 20 does not open accidentally from the main unit 10.

Upon the top end surface of this display unit 20 is arranged an operating element 222 for unlocking, and when this operating element 222 is depressed, the hook 221 moves in the unlocking direction. By depressing this operating element 222 when the display unit 20 is in the closed condition shown in FIG. 3, the hook 221 is released from the engaging hole 13 and the display unit 20 can be opened.

A photographing window 23 from which a lens of a camera module, which will be described later, makes an appearance, is provided in a position of the display unit 20 above the top edge of the display screen 21 and in side-by-side relation with the hook 221. This photographing window 23 is constructed in such a manner that the front surface of a hole provided in the cabinet where the camera module is to be disposed is covered with a transparent acrylic plate or the like. Furthermore, an infrared receiving window 24 for infrared communication is formed beside this photographing window 23.

Furthermore, as shown in FIG. 4, upon the bottom surface of the main unit 10, as components necessary for later descriptions, there are disposed a card housing section 18 that houses a B-CAS card 41, which is inserted from a card slot 17 so as to be capable of being inserted and extracted, and a lid 19 that covers an HDD housing section in which a hard disk drive (hereinafter called HDD) unit is loaded.

(Superstructure of Display Unit)

Figure 5:
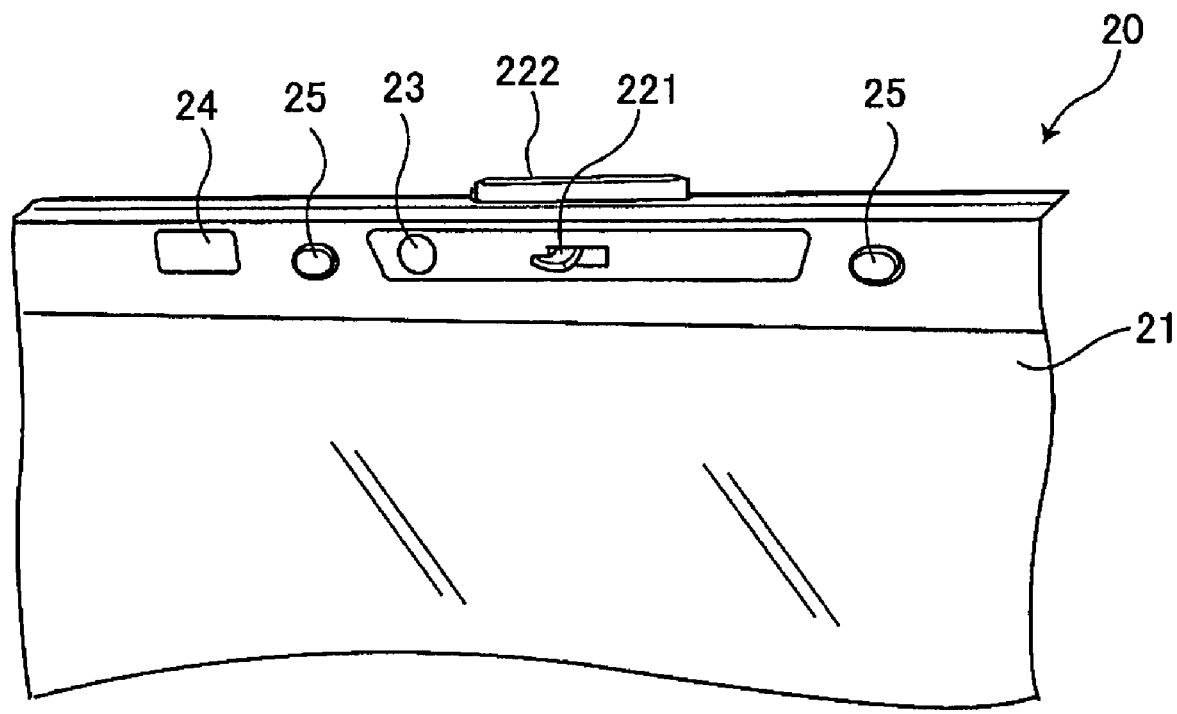
FIG. 5 is a diagram showing an enlarged upper middle part of the front of a display unit.

FIG. 5 is a diagram showing an enlarged upper middle part of the front of the display unit.

In a position above the top edge of the display screen 21, the hook 221 for locking protrudes to the front of the display unit 20, and the top end surface of the display screen 21 is provided with the operating element 222 for unlocking in a protruding condition. The photographing window 23 from which a lens of a camera module, which will be described later, makes an appearance, is formed in a position of the front of the display unit 20 adjacent to the hook 221. This photographing window 23 is covered with a transparent acrylic plate or the like. Furthermore, the infrared receiving window 24 is also provided beside this photographing window 23.

Furthermore, pads 25 that hide screw heads used in screwing the front frame constituting the display unit 20 are seen here.

Figure 6:
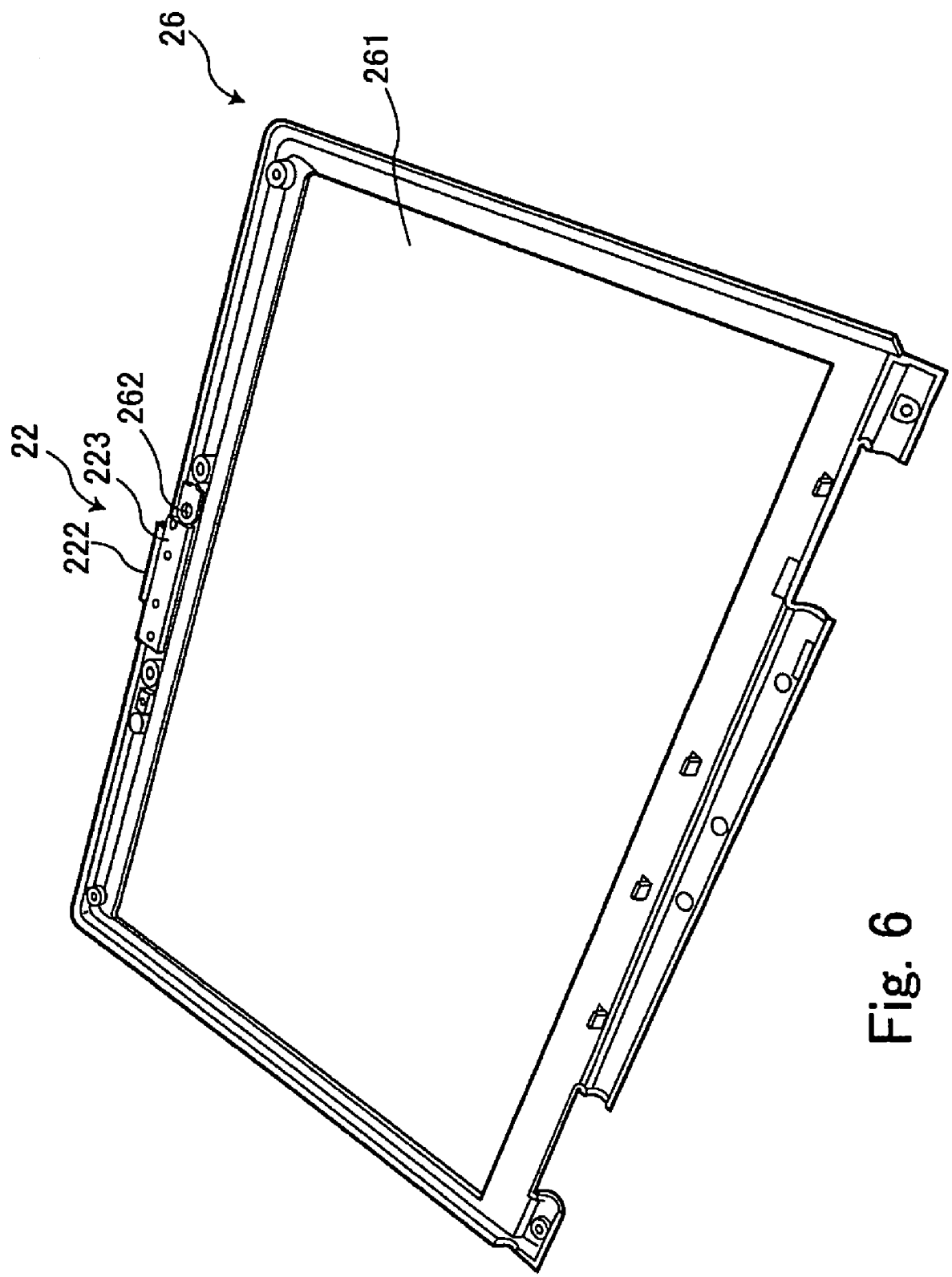
FIG. 6 is a perspective view of a front frame covering the periphery of a display screen as viewed from the side of an inner wall surface of the front frame.
Figure 7:
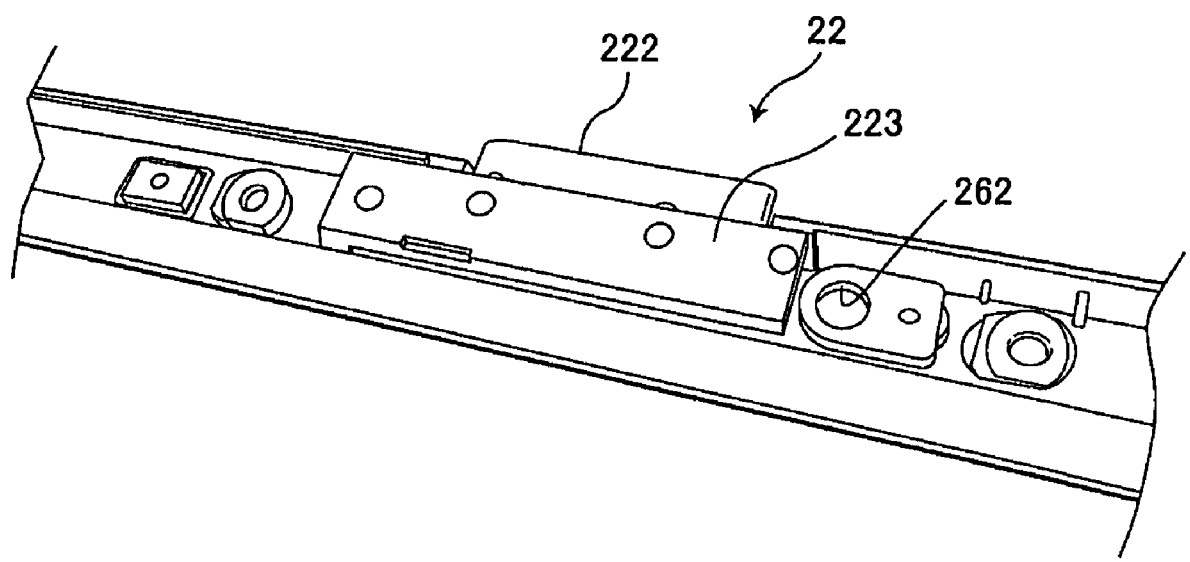
FIG. 7 is an enlarged view showing the upper middle part of the inner wall surface of the front frame.
Figure 8:
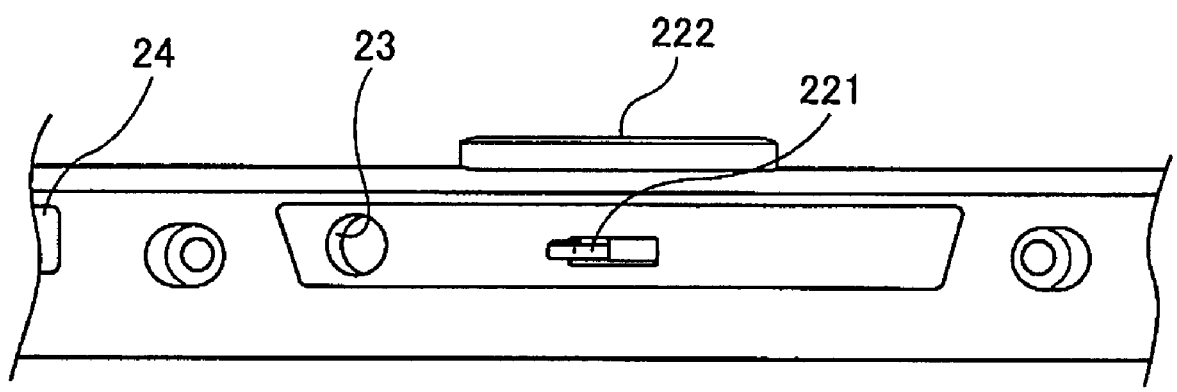
FIG. 8 is an enlarged view showing an upper middle part of an outer wall surface of the front frame.

FIG. 6 is a perspective view of the front frame covering the periphery of the display screen 21 as viewed from the side of an inner wall surface of the front frame. FIG. 7 is an enlarged view showing an upper middle part of the inner wall surface of the front frame 26. And FIG. 8 is an enlarged view showing an upper middle part of the outer wall surface of the front frame 26.

This front frame 26 is a member that forms the front of the display unit 20 (see FIGS. 1 and 2) at the periphery of the display screen 21 in such a manner that the display screen 21 is exposed from an opening 261 in the middle of the front frame 26.

In the upper middle part of the inner wall surface of this front frame, there is provided, in addition to the hook 221 (see FIG. 8) and the operating element 222, a lock module 22 having a connecting mechanism section 223 that transmits the operation of the operating element 222 to the hook 221. This connecting mechanism section 223 assumes the role of transmitting the operation to the operating element 222 as an action of disengagement of the hook 221.

On the right-hand part of this lock module 22 in FIG. 7 (on the left-hand part in FIG. 8), there is formed a lens loading hole 262 leading to the photographing window 23 into which a lens of the camera module is loaded.

Figure 9:
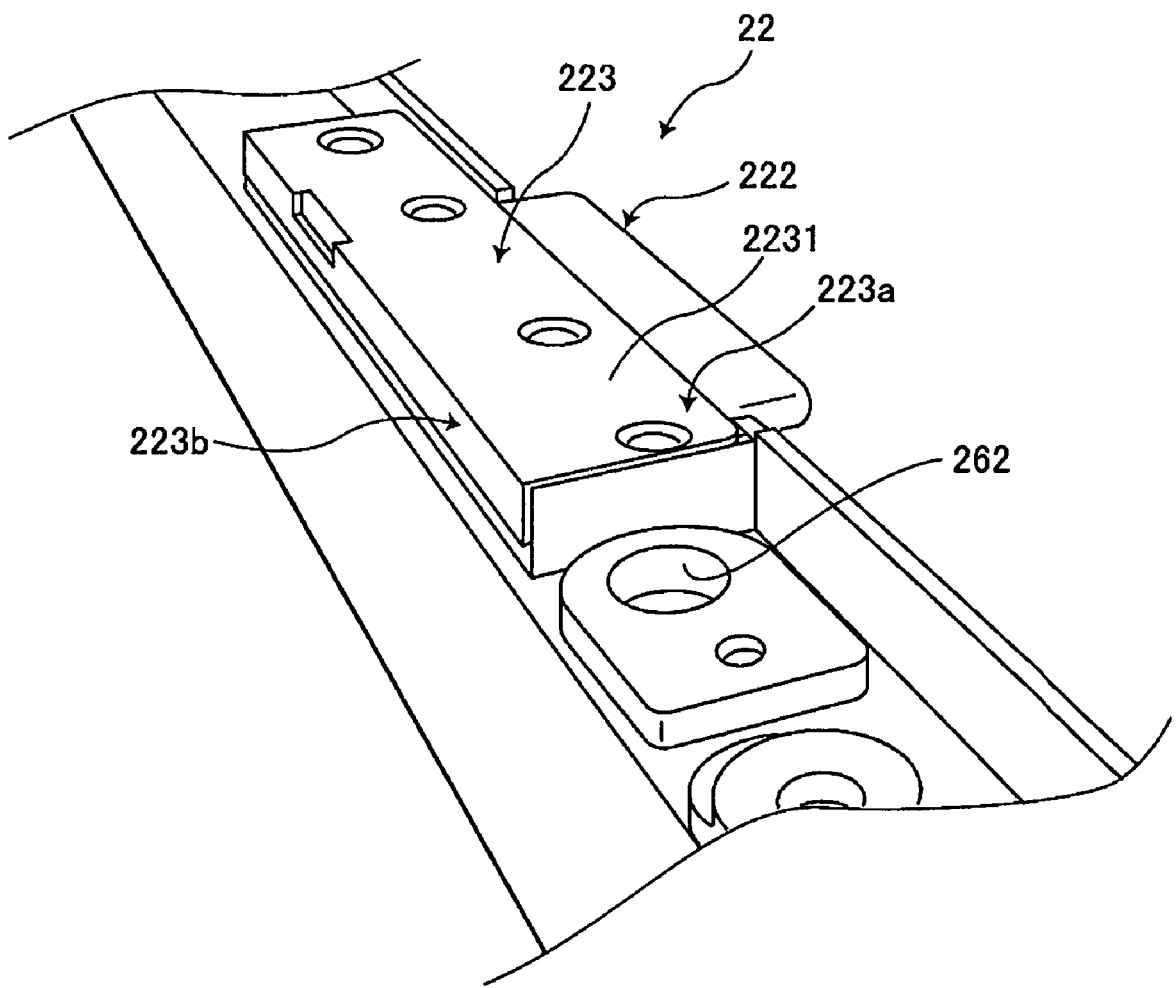
FIG. 9 is an enlarged perspective view of the upper middle part of the inner wall surface of the front frame as obliquely viewed.

FIG. 9 is an enlarged perspective view of the upper middle part of the inner wall surface of the front frame as obliquely viewed.

As is apparent from FIG. 9, the connecting mechanism section 223 that constitutes the lock module 22 is covered with a metal plate 2231 bent in the form of the letter L so that the metal plate 2231 extends into a surface 223a in superposed relation with a substrate, which will be described later, and a surface 223b perpendicular to this surface 223a.

This L-shaped metal plate 2231 has the roles of both ensuring the strength of this connecting mechanism section 223 and cooling a heat-generating electronic part mounted on a substrate, which will be described later.

Figure 10:
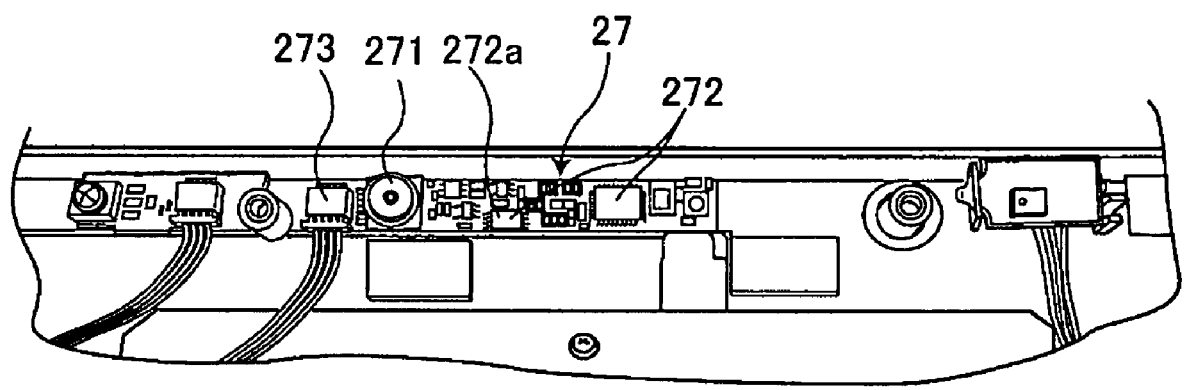
FIG. 10 is a view of the upper middle part of a display unit from which the front frame was removed.

FIG. 10 is a view of the upper middle part of the display unit from which the front frame was removed.

In this part, the camera module 271 is fixed and furthermore, there is disposed a substrate 27 on which a large number of electronic parts 272 that constitute a signal processing circuit for this camera module 271 are mounted. The signal processing circuit on this substrate 27 is electrically connected to the outside of this substrate via a connector 273.

One electronic part 272a belonging to the many electronic parts 272 that constitute this signal processing circuit is a heat-generating electronic part that generates considerable heat during operation.

When the front frame 26 shown in FIG. 6 is attached, the camera module 271 is inserted into the lens loading hole 262 (see FIG. 9) and a lens makes an appearance from the photographing window 23 (see FIG. 8). Also, the region of the substrate 27 where the electronic parts 272 are mounted is disposed in a position in superposed relation with the connecting mechanism section 223 of the lock module 22. At this time, the L-shaped metal plate 223 shown in FIG. 9 approaches the electronic parts 272 on the substrate 27 and is disposed so as to cover these electronic parts 272. As a result of this, the L-shaped metal plate 223 assists the heat-generating electronic part 272a in the heat release thereof and serves also as a shield for these electronic parts 272.

In this embodiment, as described above, the connecting mechanism section 223 and the substrate 27 are disposed in a position in superposed relation in the thickness direction and, therefore, the hook 221 constituting the lock module 22 and the photographing window 23 are disposed in positions close to each other in the upper middle part of the display unit 20.

(Card Access Unit)

Figure 11:
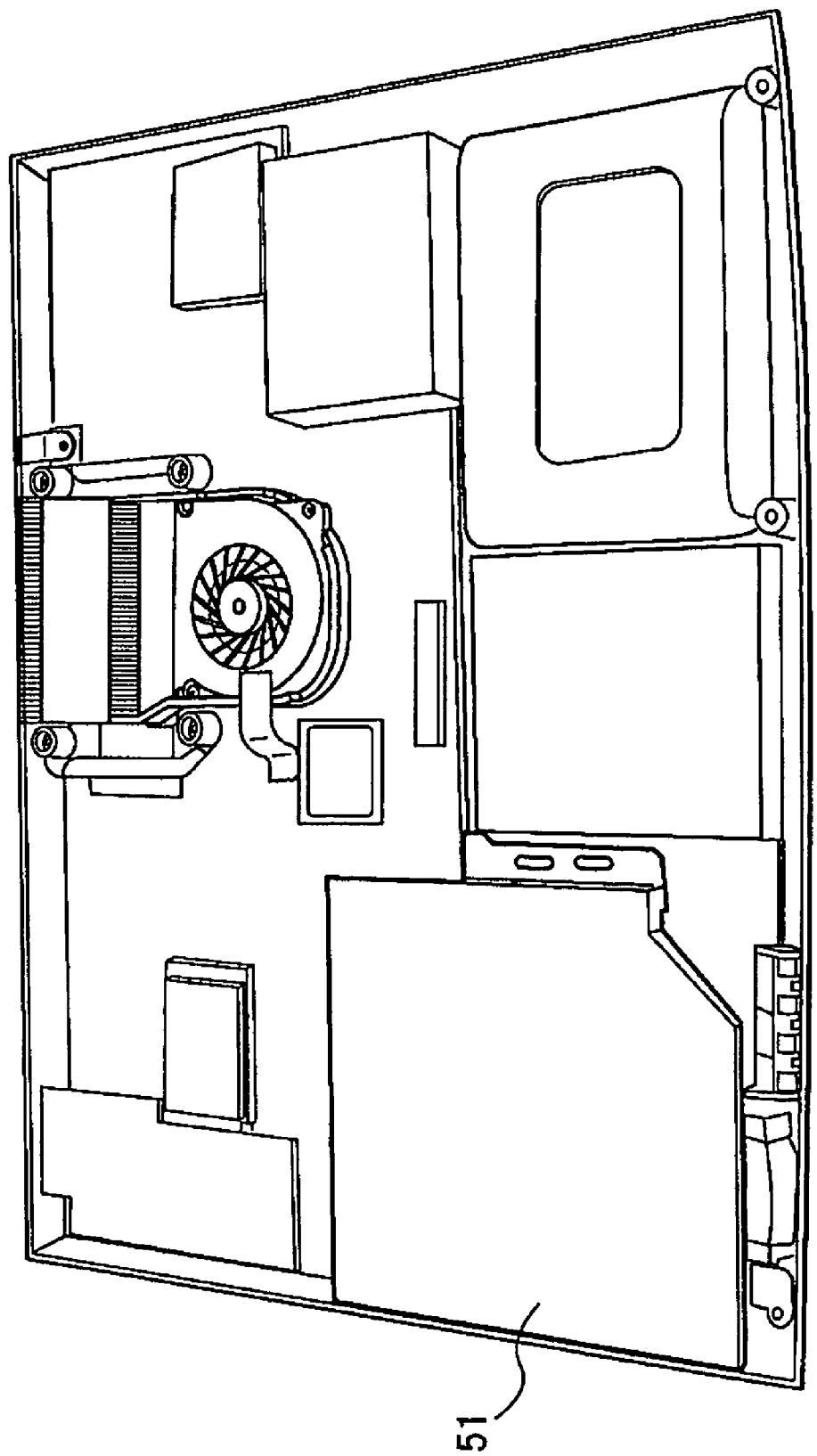
FIG. 11 is a perspective view showing the interior of a cabinet on the bottom surface side after the removal of components on a top surface, such as a keyboard of a main unit.

FIG. 11 is a perspective view showing the interior of the cabinet on the bottom surface side after the removal of components on the top surface, such as the keyboard 11 of the main unit 10.

A large number of electronic parts are mounted within the cabinet on the bottom surface side that constitutes the main unit 10. A CD/DVD drive unit 51 is mounted here as one of these electronic parts.

Figure 12:
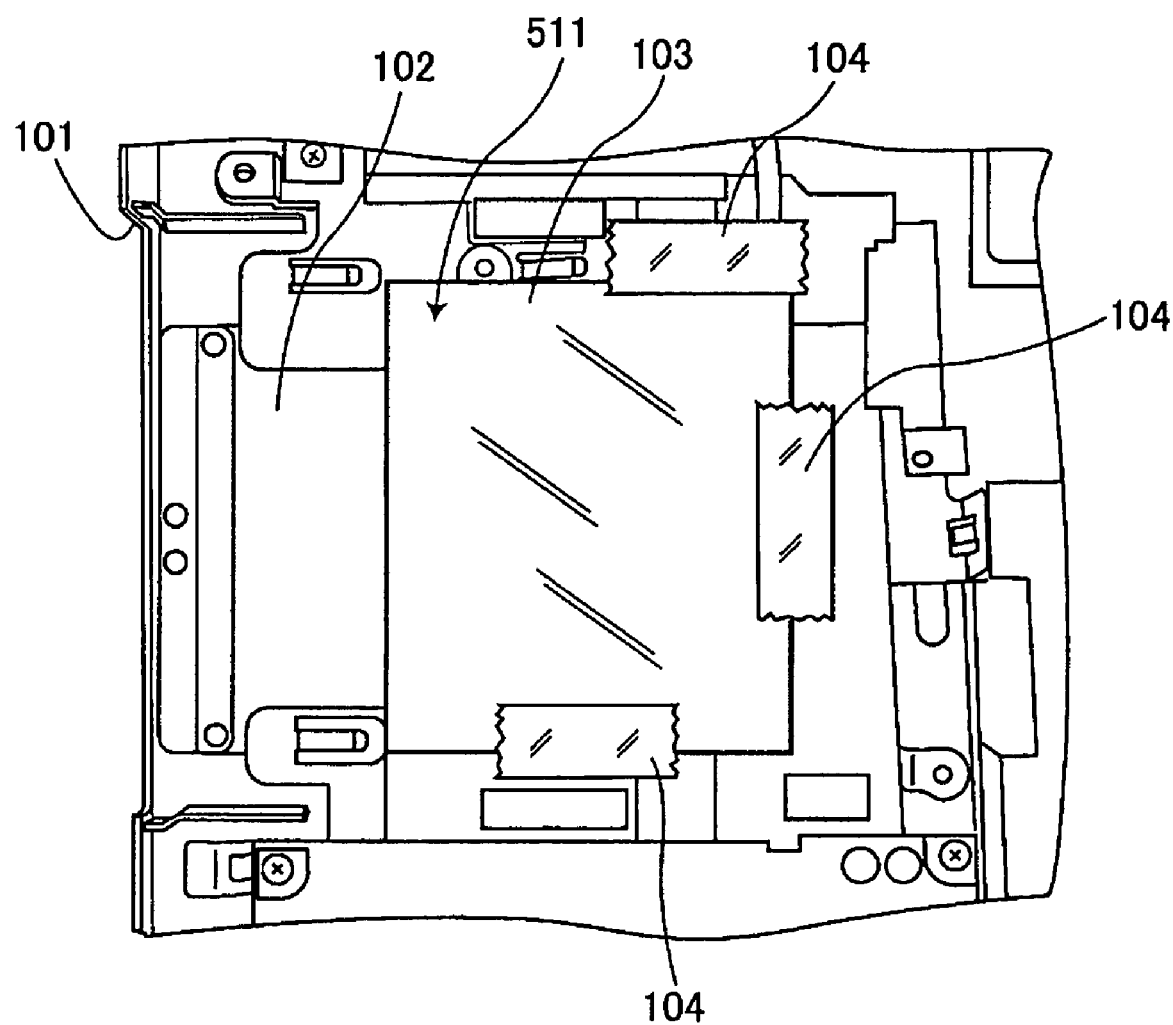
FIG. 12 is a diagram showing a part from which a CD/DVD drive unit was removed.

FIG. 12 is a diagram showing a part from which the CD/DVD drive unit 51 was removed.

The CD/DVD drive unit 51 shown in FIG. 11 is an electronic part that is loaded into a CD/DVD drive unit loading section 511 from an electronic part loading port 101 provided in the cabinet constituting the main unit 10 so as to be capable of being loaded and unloaded. Once the CD/DVD drive unit 51 has been loaded, the CD/DVD drive unit 51 is not removed during ordinary use. However, in case of failure and the like, the CD/DVD drive unit 51 can be removed from the electronic part loading port 101. This CD/DVD drive unit 51, as loaded from the electronic part loading port 101, stops up the opening of the electronic part loading port 101, and the surface of the CD/DVD drive unit 51 forms part of the cabinet defining the outside shape of the main unit 10.

A shield plate 102 is laid on the CD/DVD drive unit loading section 511, and the CD/DVD drive unit 51 that is loaded from the electronic part loading port 101 is placed on this shield plate 102.

Upon this shield plate 102, an insulating sheet 103 is laid and is stuck with adhesive tape 104.

Figure 13:
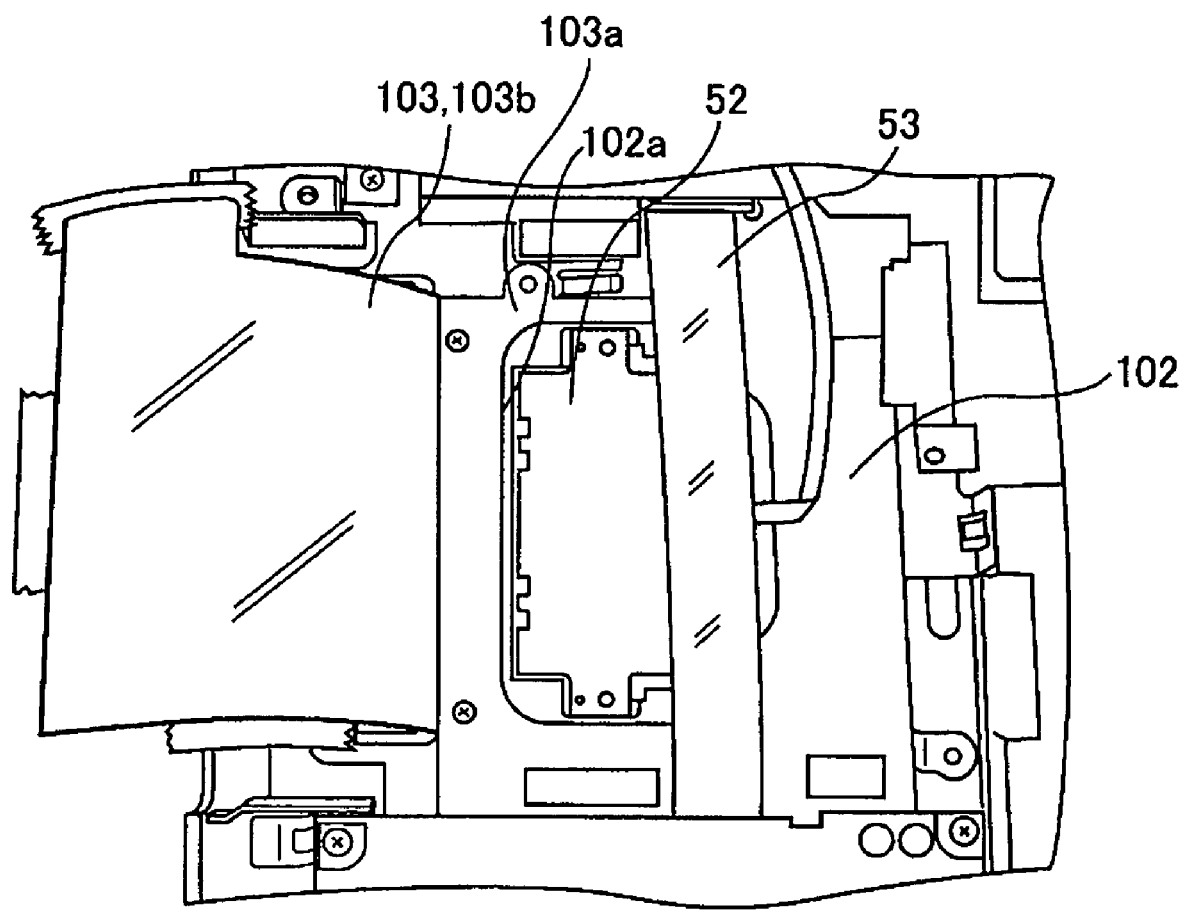
FIG. 13 is a diagram showing a CD/DVD drive unit loading section in which a sheet is caused to extend by stripping adhesive tape.

FIG. 13 is a diagram showing the CD/DVD drive unit loading section 511 in which the sheet 103 is caused to extend by stripping the adhesive tape 104.

An opening 102a is formed in the shield plate 102, and a card access unit 52 is disposed in a position inside this opening 102a.

A flat cable 53 that connects two circuit boards extends over the shield plate 101.

The sheet 103 has a fixed portion 103a that is fixed to the shield plate 102 and a folded-back portion 103b that is folded back in a position near the electronic part loading port 101 and extends on the fixed portion 103a. When the folded-back portion 103b is folded back (see FIG. 12), the flat cable 53 becomes sandwiched between the fixed portion 103a and folded-back portion 103b of the sheet 103, and the opening 102a of the shield plate 102 and the card access unit 52 become covered with the folded-back portion 103b. Therefore, during loading and unloading, the CD/DVD drive unit 51 can be smoothly loaded and unloaded without damage or break by being caught in the edge of the opening 102a of the shield plate 102, the card access unit 52 and the flat cable 53.

Figure 14:
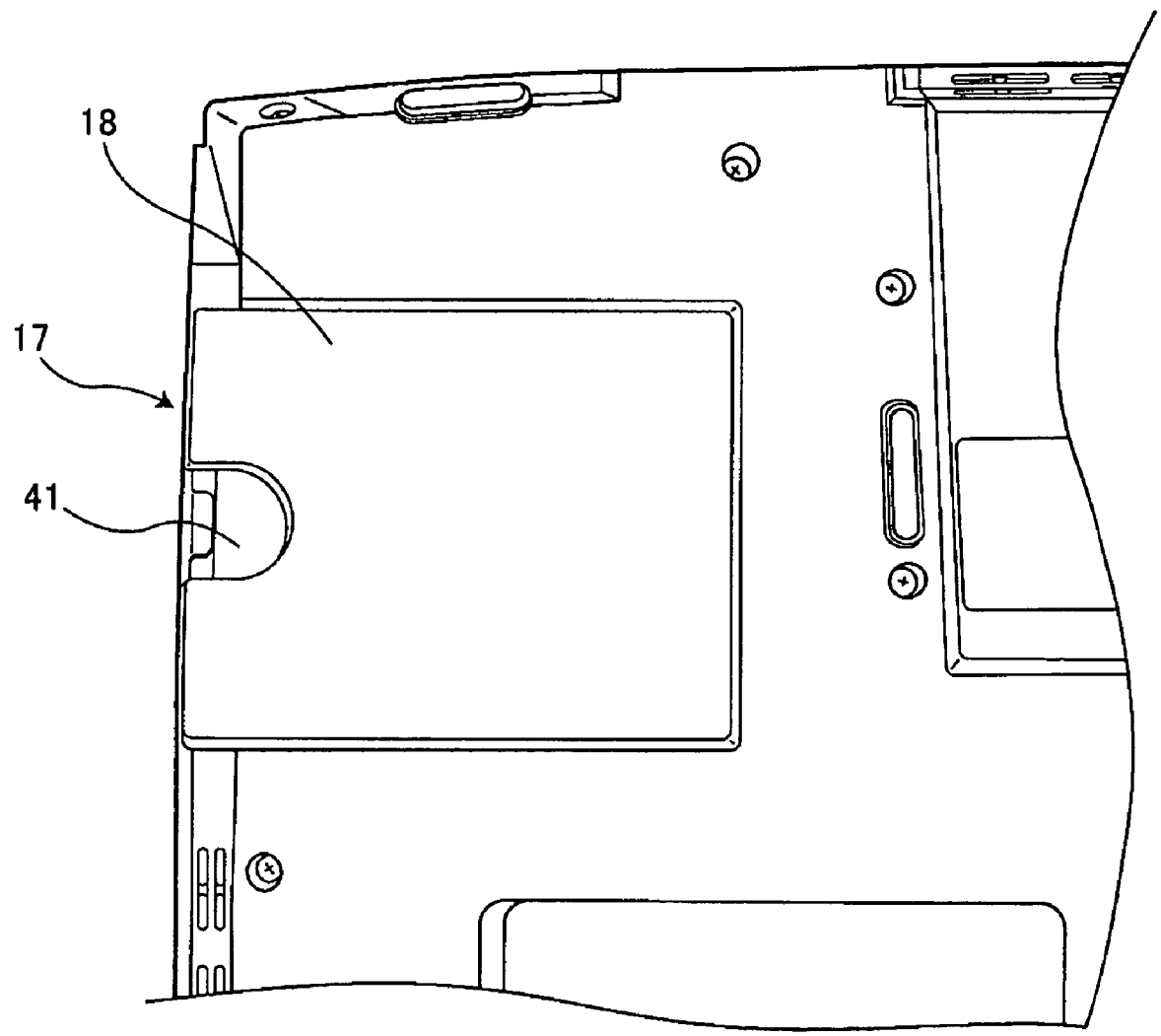
FIG. 14 is a partially enlarged view of a bottom surface of the main unit.

FIG. 14 is a partially enlarged view of the bottom surface of the main unit 10.

Upon this bottom surface, also as shown in FIG. 4, there is formed the card housing section 18 that houses the B-CAS card 41, which is inserted from the card slot 17, which is formed in one end surface of the cabinet of the main unit 10, so as to be capable of being inserted and extracted.

Figure 15:
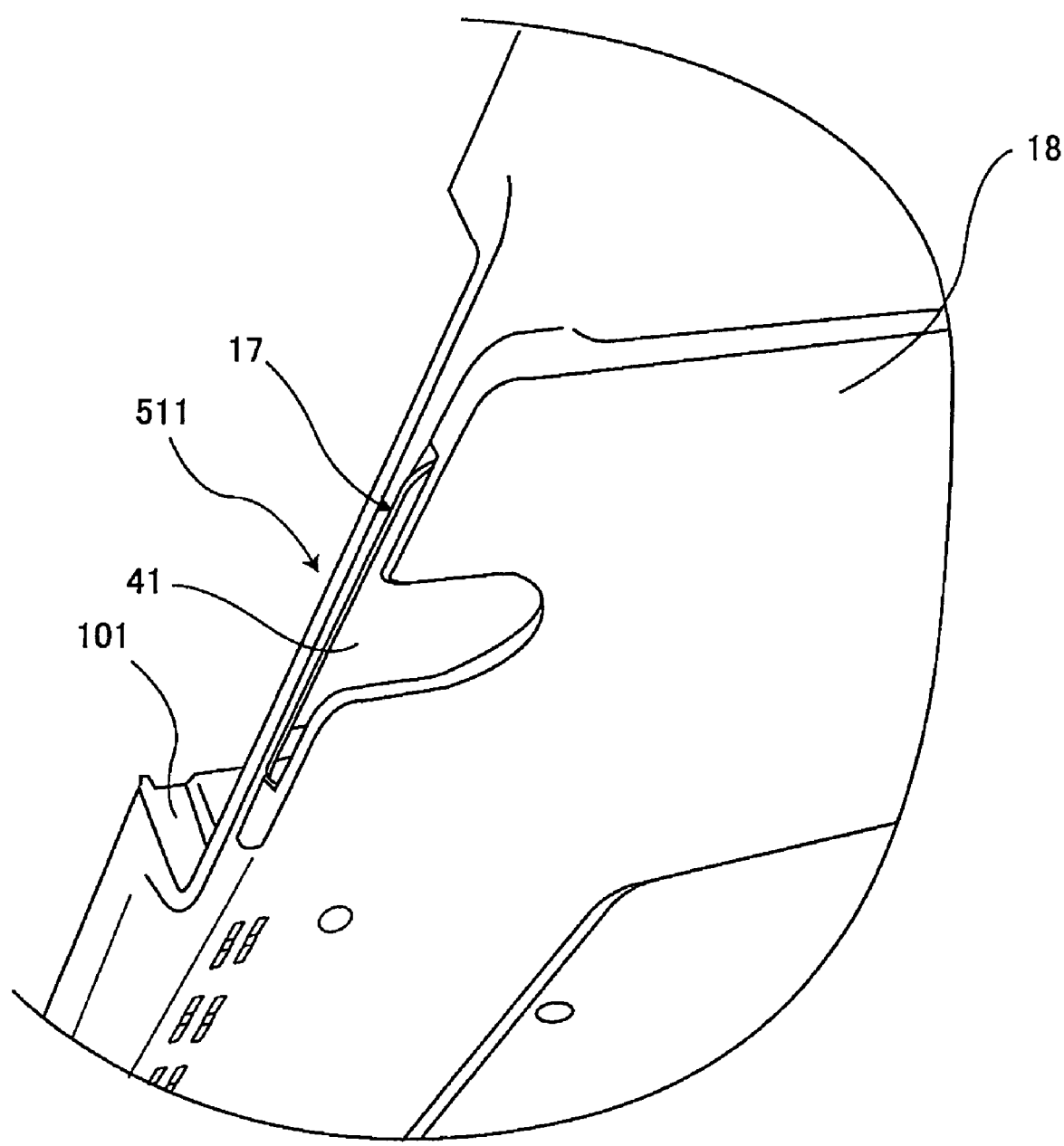
FIG. 15 is a partial perspective view of a card slot portion of a part of the cabinet constituting the main unit on the bottom surface side, where a B-CAS card is to be inserted.

FIG. 15 is a partial perspective view of a card slot portion of a part of the cabinet constituting the main unit on the bottom surface side, where the B-CAS card is to be inserted.

As shown in FIG. 15, this card slot 17 is formed in a position in superposed relation with the electronic part loading port 101 (see also FIG. 12), into which the CD/DVD drive unit is to be loaded, in the thickness direction of the main unit 10, and the card housing section 18 is formed in a position in superposed relation with the CD/DVD drive unit loading section 511, into which the CD/DVD drive unit 51 is to be loaded.

Figure 16:
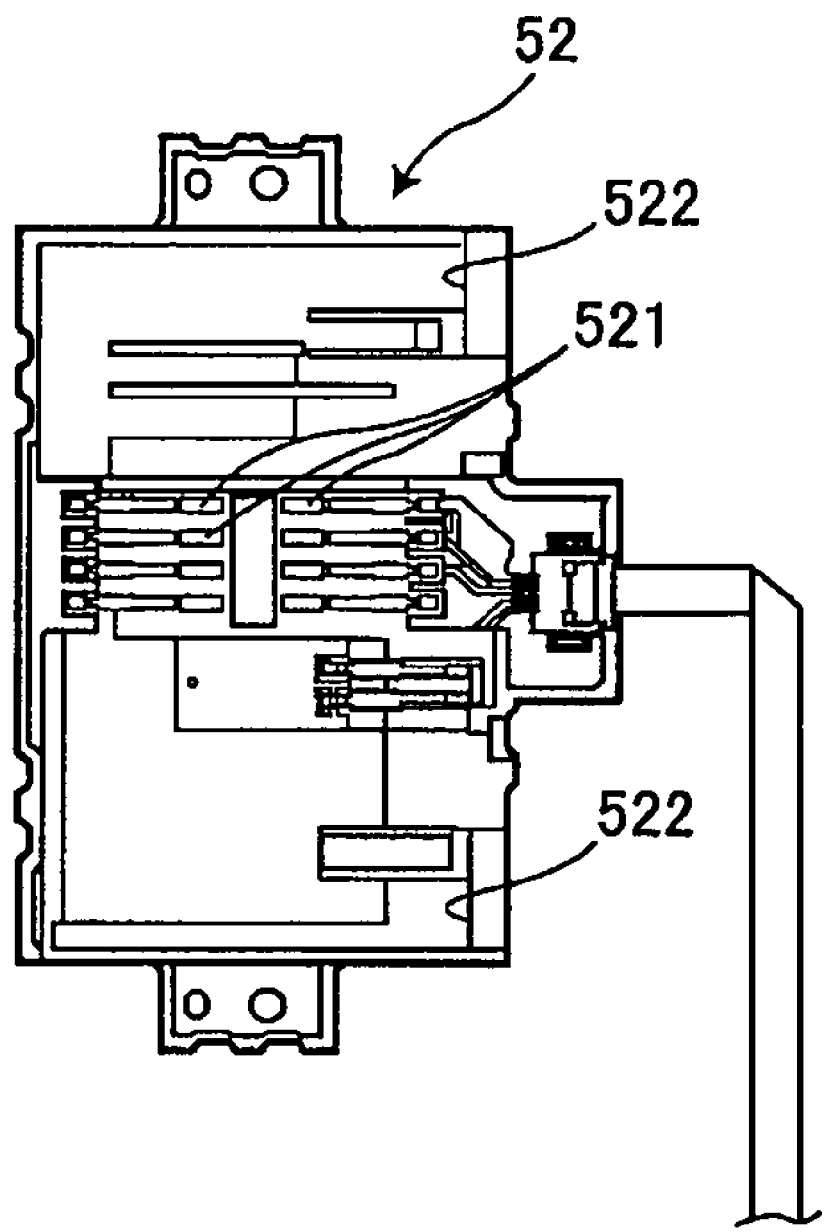
FIG. 16 is a diagram showing a surface on the side where contacts of a card drive unit are disposed.

FIG. 16 is a diagram showing a surface on the side where contacts of the card access unit 52 are disposed (in this embodiment, this surface is called an inner surface).

Upon this surface, multiple contacts 521 are provided. In the B-CAS card 41 inserted from the card slot 17, electrodes (not shown) are formed in places corresponding to these contacts 521 on the front end side of the insertion direction of the B-CAS card 41, and the B-CAS card 41 inserted from the card slot 17 abuts against a positioning wall 522 and stops. In this condition, the contacts 521 come into contact with the electrodes of the B-CAS card 41, and the B-CAS card 41 is accessed by this card access unit 52 via the contacts 521.

The rear surface on the back side of the inner surface of this card access unit 52 shown in FIG. 16 enters the opening 102a of the shield plate 102 shown in FIG. 13. As is apparent from FIG. 13, this card access unit 52 is fixed in a position that is spaced from the card slot 17 within the cabinet of the main unit 10 and a little back, and the B-CAS card 41 inserted from the card slot 17 is inserted into a position where only the leading end portion thereof is superposed on the card access unit 52.

Because the card access unit 52 is provided in a position spaced from the card slot 17 and a little back, it is necessary for the card access unit 52 to correctly guide the B-CAS card 41 inserted from the card slot 17 toward the card access unit 52. In this embodiment, the shield plate 102 laid under the CD/DVD drive unit 51 has a stepped form for guiding a card. Thus, it is possible to correctly guide the B-CAS card 41 inserted from the card slot 17 to the card access unit 52 by the shield plate 102 in conjunction with the inner wall of the card housing section 18 of the cabinet on the bottom surface side of the main unit 10. In this embodiment, therefore, it is unnecessary to arrange excess parts for guiding the card, because the shield plate 102, which is necessary from the beginning, is used as a guide plate. Accordingly, as the card is guided by the shield plate 102 in conjunction with the cabinet, the guiding function is realized without a cost rise due to an increase in the number of parts and an increase in size.

The card access unit 52 is disposed in such a manner that the inner surface thereof shown in FIG. 16 directly faces the inner surface of the cabinet on the bottom surface side of the main unit 10. Usually, such a card access unit 52 is provided with another plate member that faces this inner surface so as to surround the B-CAS card 41 in conjunction with the inner surface shown in FIG. 16. In this embodiment, however, such a plate member is unnecessary and the B-CAS card 41 inserted into the card access unit 52 is surrounded by the inner surface of the card access unit 52 shown in FIG. 16 and the inner wall surface of the cabinet. Therefore, this embodiment contributes to thin designs by saving such a plate member.

Furthermore, as shown in FIG. 13, the opening 102a is formed in the shield plate 102, and the card access unit 52 is disposed in such a manner that the rear surface side thereof enters the opening 102a.

Therefore, in this embodiment, it is also possible to make the thickness of the shield plate 102 thinner.

Incidentally, in the above-described embodiment, the CD/DVD drive, the shield plate, the card slot unit, and the bottom surface of the cabinet of the main unit are stacked in this order from above and, therefore, the description was given of the case where a card is guided by the shield plate 102 in conjunction with the bottom surface of the cabinet of the main unit. However, in the case where the card slot unit is provided near the top surface of the cabinet of the main unit with a reverse stacking structure, as opposed to this embodiment, it is needless to say that a card may be guided by the shield plate in conjunction with the top surface of the cabinet of the main unit.

(Speaker)

Figure 17:
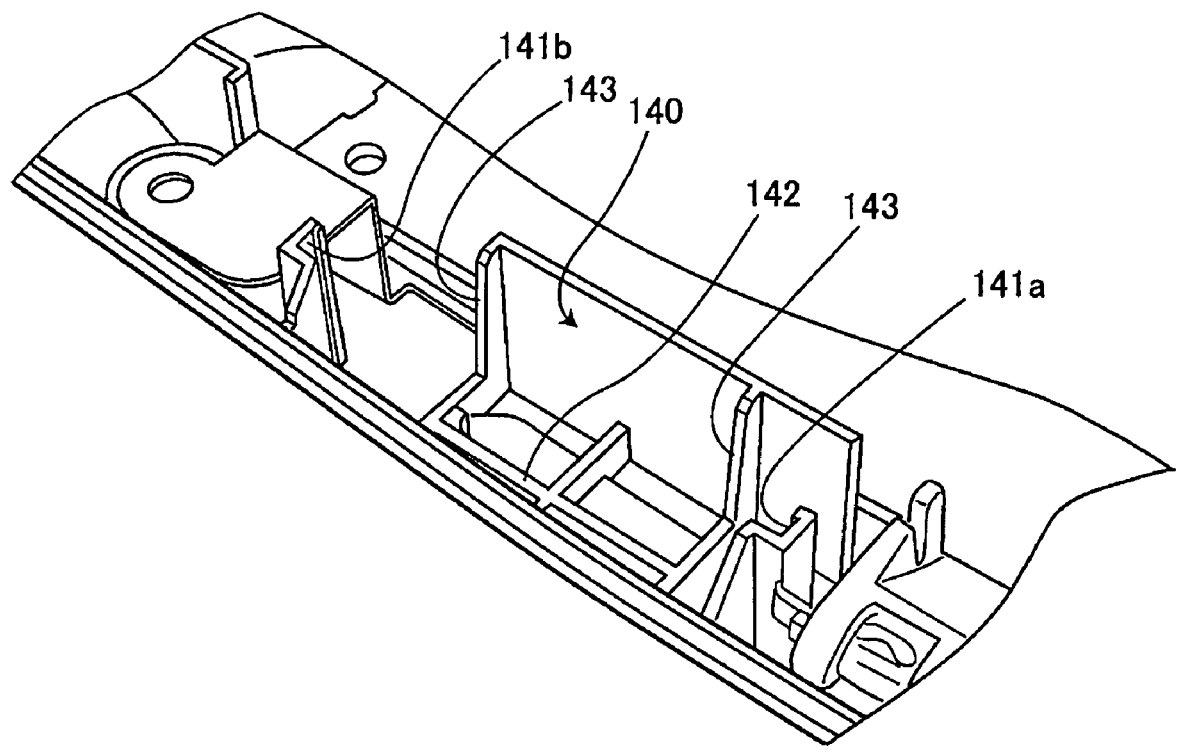
FIG. 17 is a perspective view of a speaker holding section that is formed in the interior of the cabinet of the main unit.

FIG. 17 is a perspective view of a speaker holding section that is formed in the interior of the cabinet of the main unit 10.

This speaker holding section 140 is provided on the inner side of the sound releasing ports 14 that output sound from the built-in speaker, which are shown in FIGS. 1 to 3. The sound releasing port 14 is provided in quantities of two in total, one for each of the right- and left-hand parts of the front of the main unit 10. Also the speaker holding section 140 is provided for each of the two sound releasing ports 14 and the right and left speaker holding sections have almost the same structure. Only one of the two sound releasing ports 14 is shown in FIG. 17.

This speaker holding section 140 has a pair of side guides 141a, 141b that guide both side surfaces of the speaker, a pedestal 142 on which the undersurface of the speaker is placed, and a back 143 that supports the rear surface of the speaker.

Figure 18:
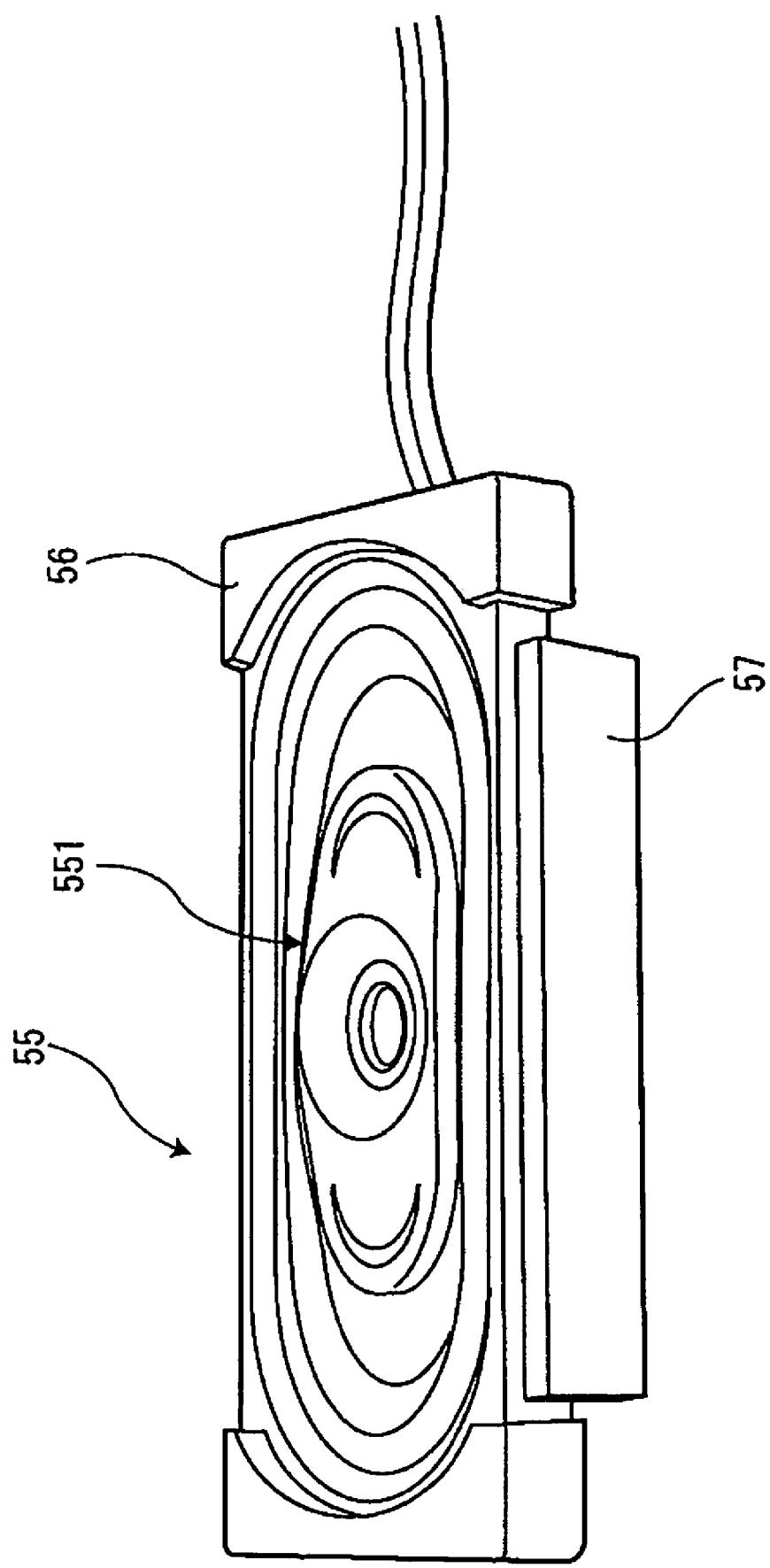
FIG. 18 is a perspective view of a vibrating surface of a speaker as obliquely viewed from above, showing the speaker and cushion members fixed to the speaker.
Figure 19:
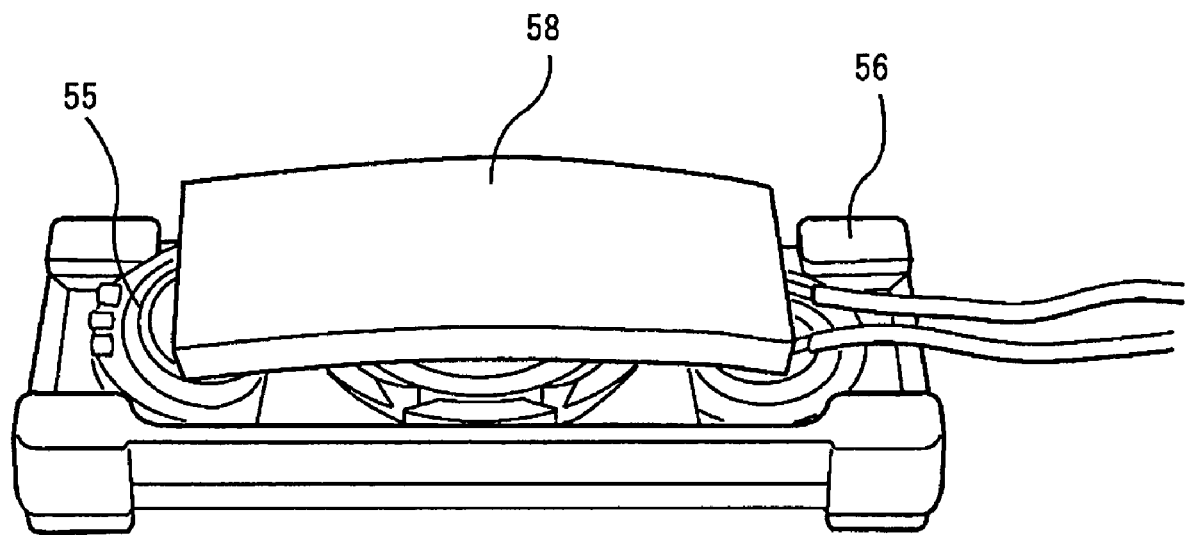
FIG. 19 is a perspective view of the speaker and the cushion members as viewed from the rear surface side, which is a reverse side of the vibrating surface.
Figure 20:
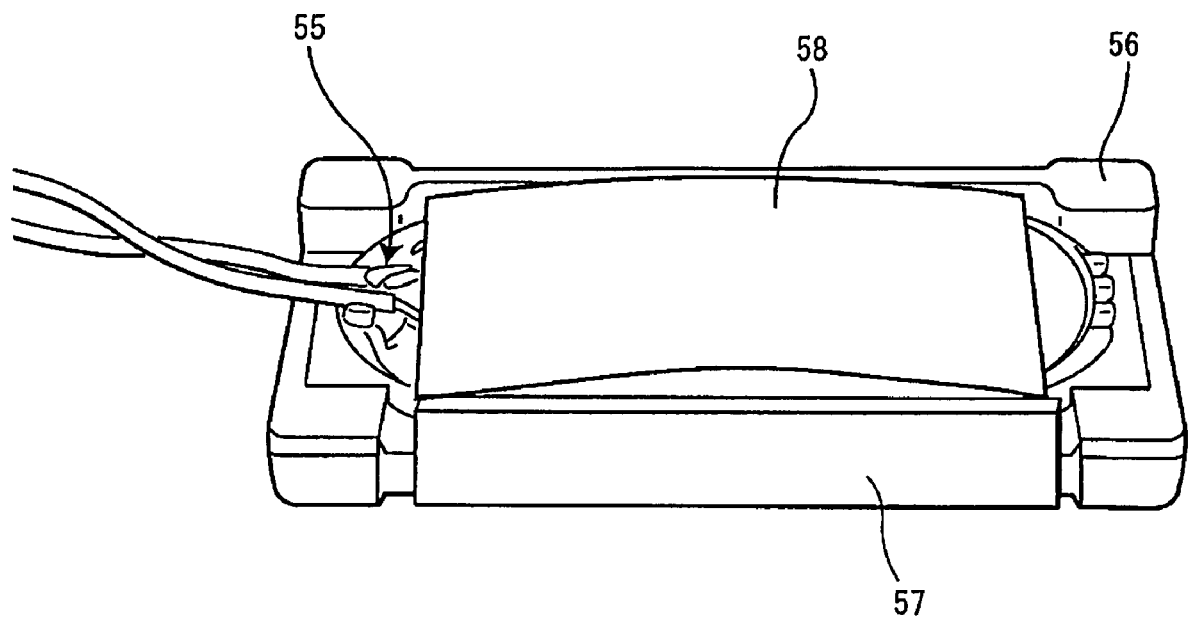
FIG. 20 is a perspective view of the speaker and the cushion members as viewed from a side different from the side of FIG. 19 on the rear surface side.

FIG. 18 is a perspective view of a vibrating surface 551 of a speaker 55 as obliquely viewed from above, showing the speaker 55 and cushion members 56,57,58 fixed to the speaker. FIG. 19 is a perspective view of the speaker 55 and the cushion members 56,57,58 as viewed from the rear surface side, which is a reverse side of the vibrating surface 551. FIG. 20 is a perspective view of the speaker 55 and the cushion members 56,57,58 as viewed from a side different from the side of FIG. 19 on the rear surface side. And FIG. 21 is a perspective view of a first cushion member 56.

As shown in FIG. 18, the vibrating surface 551 of this speaker 55 is oval, but the surface enclosing the vibrating surface 551 on the side of this vibrating surface 551 is rectangular as a whole.

Figure 21:
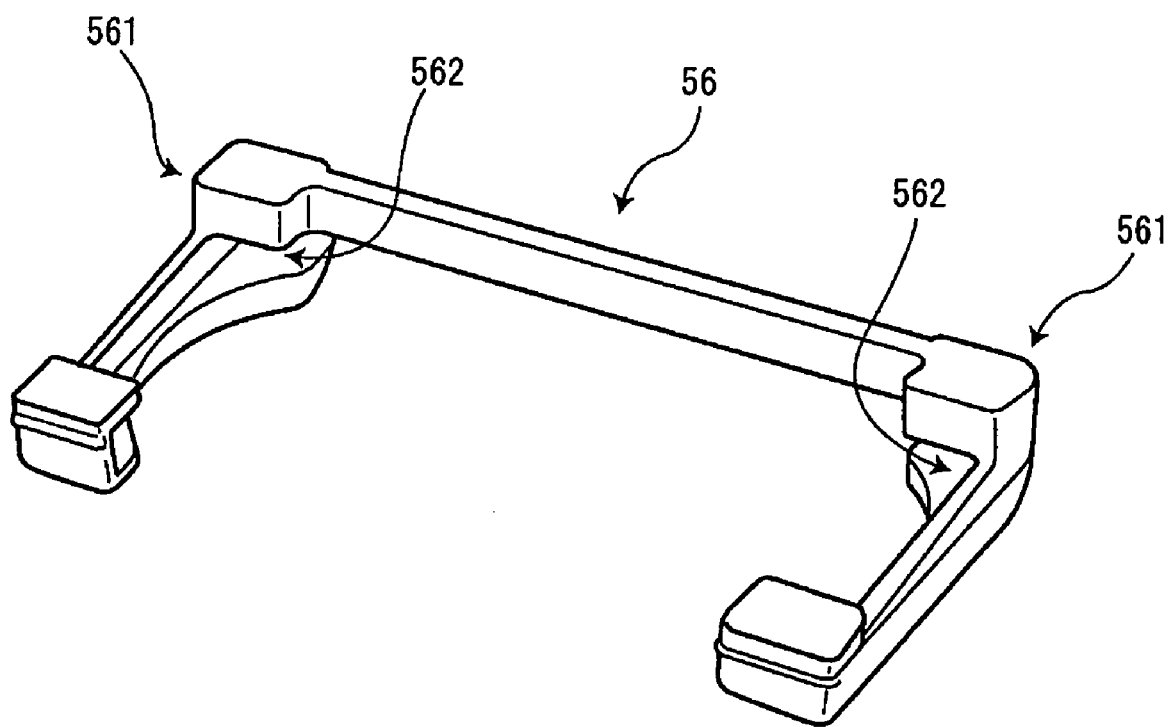
FIG. 21 is a perspective view of a first cushion member.

A first cushion member 56 having the shape as shown in FIG. 21 is disposed on the right and left side surfaces of this rectangular speaker 55, a second cushion member 57 is disposed on the undersurface of the speaker 55, and a third cushion member 58 is disposed on the rear surface of the speaker 55.

The first cushion member 56 of FIG. 21 disposed on the right and left side surfaces of this rectangular speaker 55 is formed in one piece which a pair of fixed portions 561 disposed on the right and left side surfaces of the speaker 55 is connected so as to pass over the top surface of the speaker 55. As a result of this, a reduction in the number of parts and a cost reduction are achieved compared to a case where the right and left fixed portions 561 are separate parts.

In each of the right and left fixed portions 561 of this first cushion member 56, there is formed an insertion portion 562 into which each of the right and left side surfaces of the speaker 55 is to be inserted. This first cushion member 56 is attached to the speaker 55 by the insertion of the right and left side surfaces of the speaker 55 into the right and left insertion portions 562.

This first cushion member 56 is formed from a relatively hard material, such as hard rubber, and hence this first cushion member 56 can be fixed to the speaker 55 simply by inserting the sides of the speaker 55 into the insertion portions 562.

The side guides 141a, 141b of the speaker holding section 140 provided in the cabinet are intended for guiding the side surfaces of the speaker 55 to which the first cushion member 56 is attached, and the first cushion member 56 is configured to hold the speaker 55 in an upward condition such that the vibrating surface 551 of the speaker 55 is directed to the sound releasing port 14 when the speaker 55 with this first cushion member 56 attached thereto is inserted in the side guides 141a, 141b. Thus, this first cushion member 56 is formed from a hard material and has also the role of holding the posture of the speaker 55.

The second cushion member 57 disposed on the undersurface of the speaker 55 is formed from a material that is softer than the material for the first cushion member 56. For this reason, it is impossible to adopt a fixing method that involves fixing by insertion into the undersurface of the speaker 55 as with the material for the first cushion member 56, and this second cushion member 57 is fixed to the undersurface of the speaker 55 by adhesion. This second cushion member 57 has an adhesive layer also on the surface on the pedestal 142 side of the speaker holding section 140, and the second cushion member 57 is made to adhere also to the pedestal 142 when the speaker 55 is disposed in the speaker holding section 140. For this reason, it is possible to prevent, during assembling, the speaker 55 disposed in the speaker holding section 140 from falling off, which eliminates the need of rearrangement of the fallen speaker 55 as well as prevents the occurrence of poor assembling and the like.

Also the third cushion member 58 disposed on the rear surface of the speaker 55 is formed from a material softer than the material for the first cushion member 56 and made to adhere to the rear surface of the speaker 55.

In this embodiment, as described above, the soft cushion members 57, 58 are respectively disposed on the undersurface and rear surface of the speaker 55, and the speaker 55 with the cushion members 56,57,58 is disposed in the speaker holding section 140. Thus, transmission of the vibration of the speaker 140 to the cabinet of the main unit 10 is substantially reduced. For this reason, even if the speaker 140 is caused to sound at a great sound volume, it is possible to suppress the influence on the electronic parts of the vibration-sensitive hard disk drive (HDD) unit and the like, which are provided within the cabinet of the main unit 10.

(Mounting Structure of Hard Disk Drive Unit (HDD))

Figure 22:
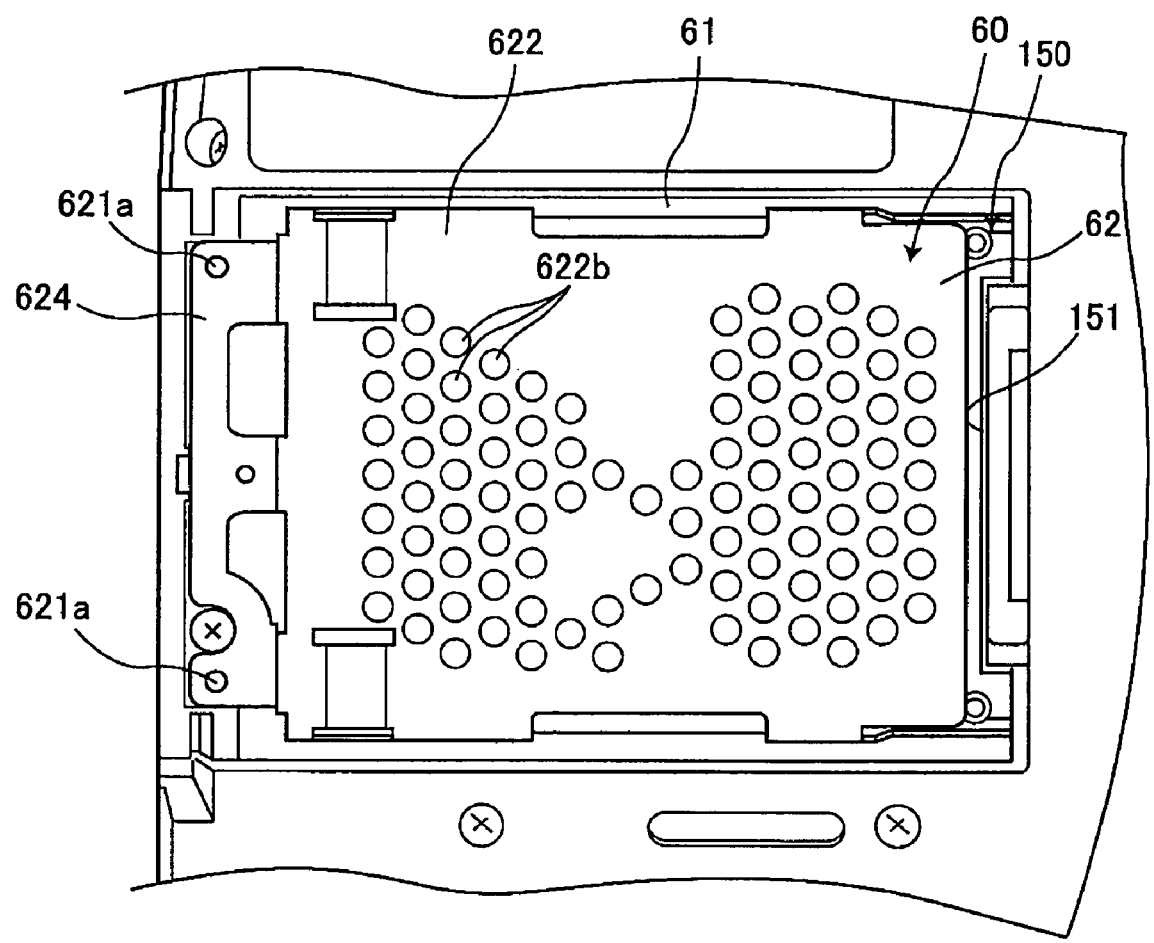
FIG. 22 is a diagram showing an HDD loading section 150 which is opened on the bottom surface of the main unit and into which a hard disk drive (HDD) unit is to be inserted.

FIG. 22 is a diagram showing an HDD loading section 150 which is opened on the bottom surface of the main unit and into which a hard disk drive unit (HDD) is to be inserted.

FIG. 22 shows a condition in which the lid 19 covering the HDD loading section 150 is removed, the HDD loading section 150 having an opening in the bottom surface of the main unit 10 and having a scraped-out shape.

The HDD unit 60 is disposed in the HDD loading section 150. This HDD unit 60 is composed of an HDD main body 61 and a mounting metal fitting 62 for mounting this HDD main body 61 to the cabinet of the main unit 10. This HDD unit 60 is screwed to the cabinet with the aid of holes 621a provided in the mounting metal fitting 62. In FIG. 22 is shown a condition in which screws in the holes 621a have been removed.

Figure 23:
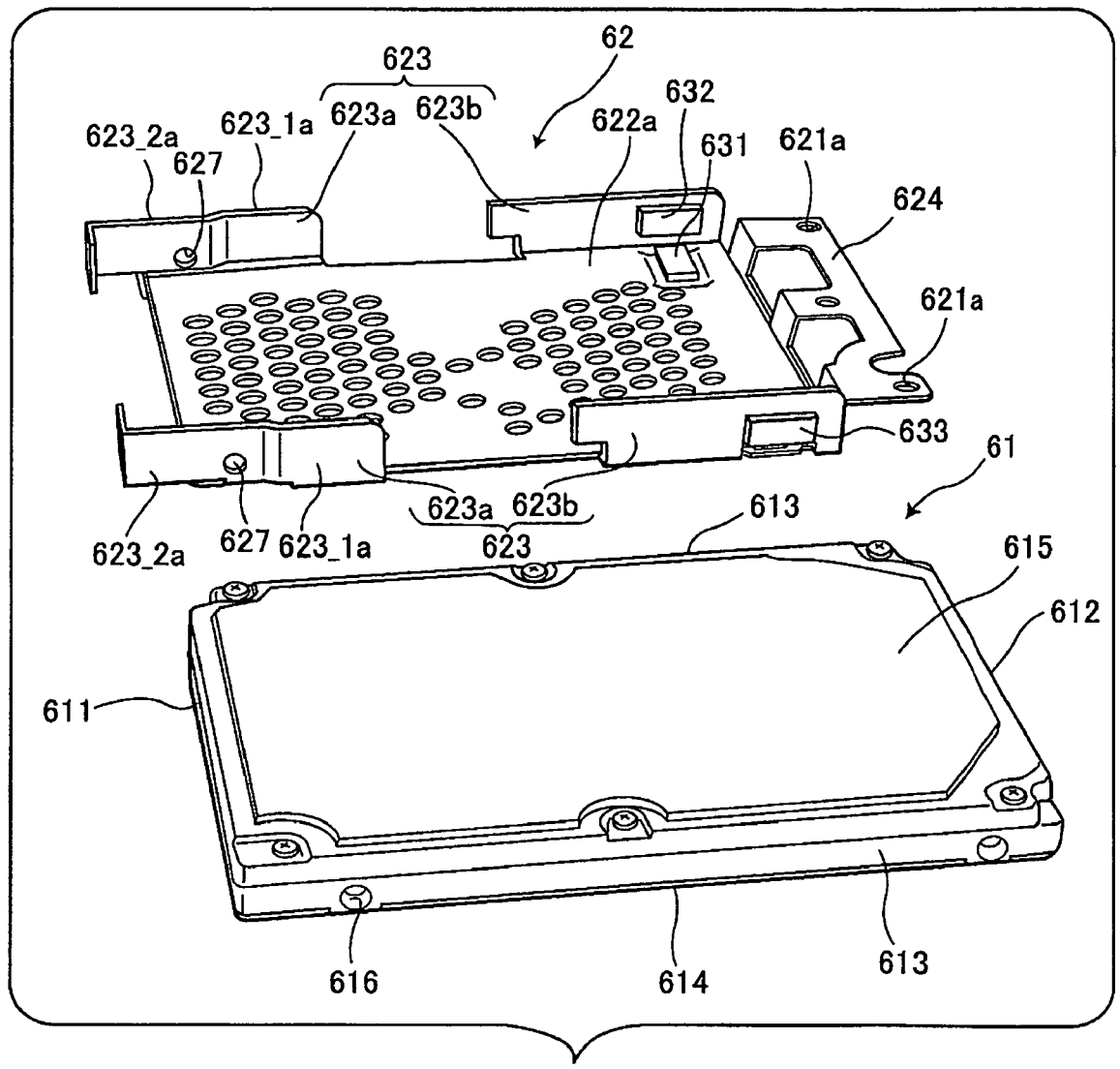
FIG. 23 is a perspective diagram showing the HDD unit disassembled into an HDD main body and a mounting metal fitting.
Figure 24:
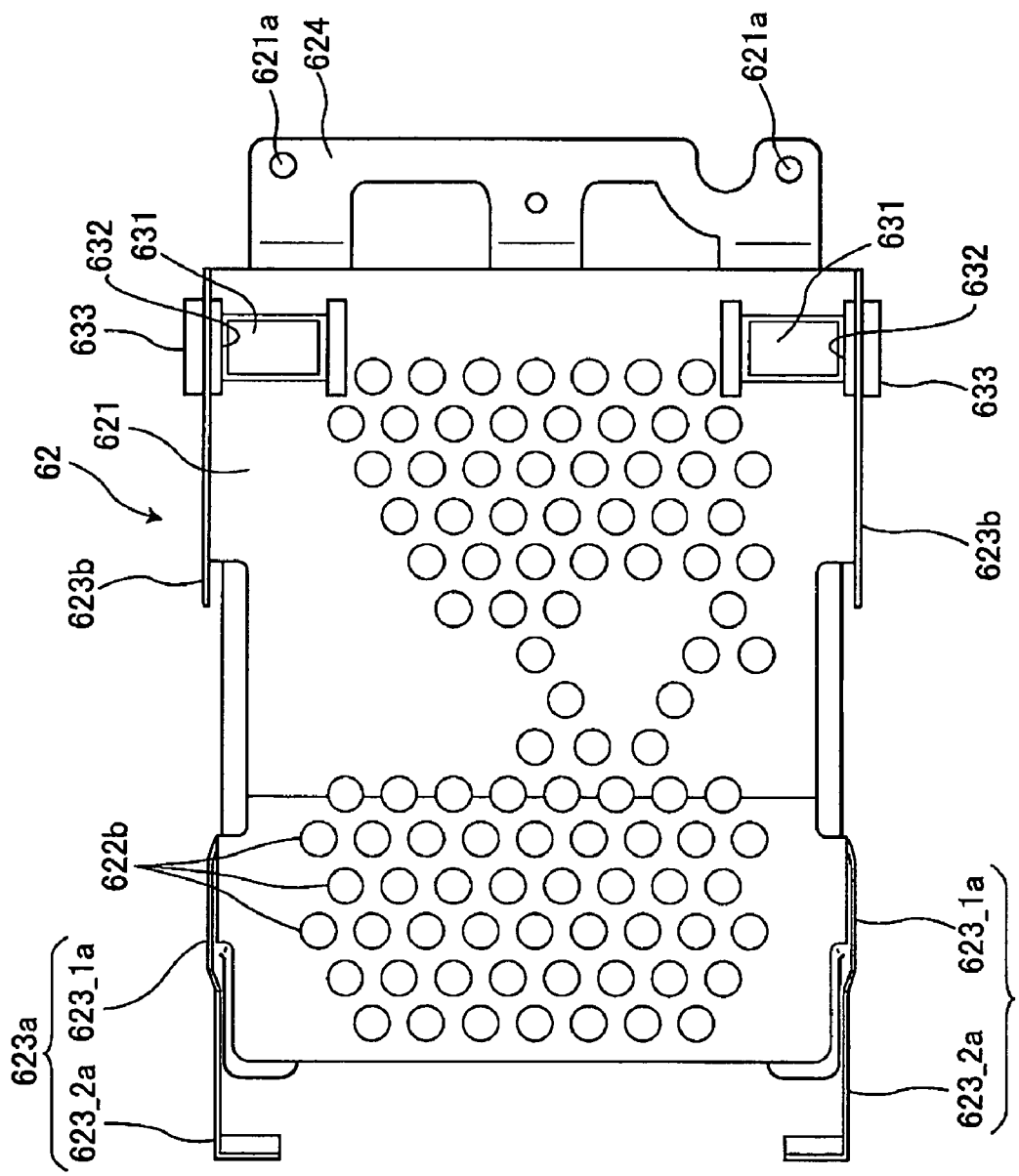
FIG. 24 is a plan view showing the inner surface of the mounting metal fitting.

FIG. 23 is a perspective diagram showing the HDD unit that is disassembled into the HDD main body 61 and the mounting metal fitting 62, and FIG. 24 is a plan view showing the inner surface of the mounting metal fitting 62.

In FIG. 23, an undersurface 615 of the HDD main body 61 and an inner surface 622a of a base portion of the mounting metal fitting 62 are shown in such a manner as to be exposed.

Figure 27:
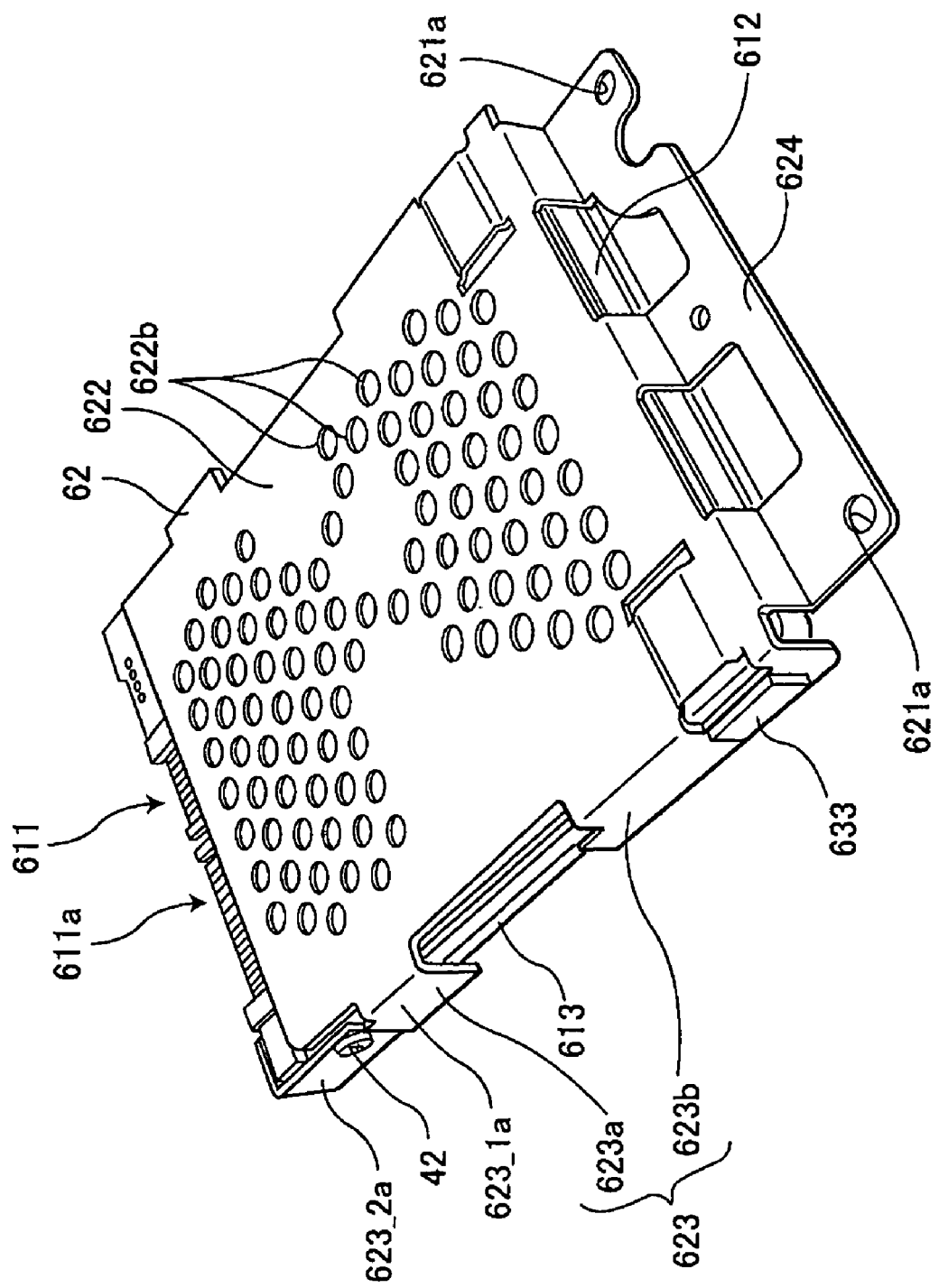
FIG. 27 is a perspective view of the mounting metal fitting attached to the HDD main body, as viewed from an angle at which an overview of the whole structure can be obtained.

This HDD main body 61 is an electronic part in the shape of a flat rectangular parallelepiped having a front end surface 611, a rear end surface 612, two right and left side surfaces 613, a top surface 614 (facing downward in FIG. 23), which is defined by the front end surface 611, the rear end surface 612, and the two side surfaces 613, and an undersurface 615 (facing upward in FIG. 23). In this embodiment, as shown in FIG. 27, a connector 611a is provided in the front end surface 611.

The HDD main body 61 is disposed on the mounting metal fitting 62 so that the top surface 614 thereof faces the inner surface 622a of the base portion of the mounting metal fitting 62. At this time, a cushion member 631 is disposed on the inner surface 622a of the mounting metal fitting 62 so that the top surface 614 of the HDD main body 61 does not directly strike the inner surface 622a of the mounting metal fitting 62. This cushion member 631 is disposed in a position on the inner surface 622a of the mounting metal fitting 62 where a part of the top surface 614 of the HDD main body 61 near the rear end surface side comes into contact. However, on the front end surface side of the HDD main body 61, with the aid of a screw insertion hole 627 of the mounting metal fitting 62 and a screw hole 616 of the HDD main body 61, the mounting metal fitting 62 is screwed to the HDD main body 61 so that a part of the top surface 614 of the HDD main body 61 near the front end surface 611 does not come into direct contact with the inner surface 622a of the mounting metal fitting 62, either.

Also for the side surfaces, in the mounting metal fitting 62, there are disposed cushion members 632 that come into contact with the two side surfaces 613 of the HDD main body 61 at positions near the rear end surface 612. No cushion member is disposed on the side surfaces 613 of the HDD main body 61 at positions near the front end surface 612, because the mounting metal fitting 62 is screwed at these positions.

A cushion member 633 is disposed also on the outer side of the mounting metal fitting 62, such that the mounting metal fitting 62 is interposed between the cushion members 632 and 633. This cushion member 633 on the outer side is placed between the mounting metal fitting 62 and an inner wall of the HDD loading section 150 when the HDD unit 60 in which this mounting metal fitting 62 is attached to the HDD main body 61 is loaded into the HDD loading section 150 (see FIG. 22).

Figure 25:
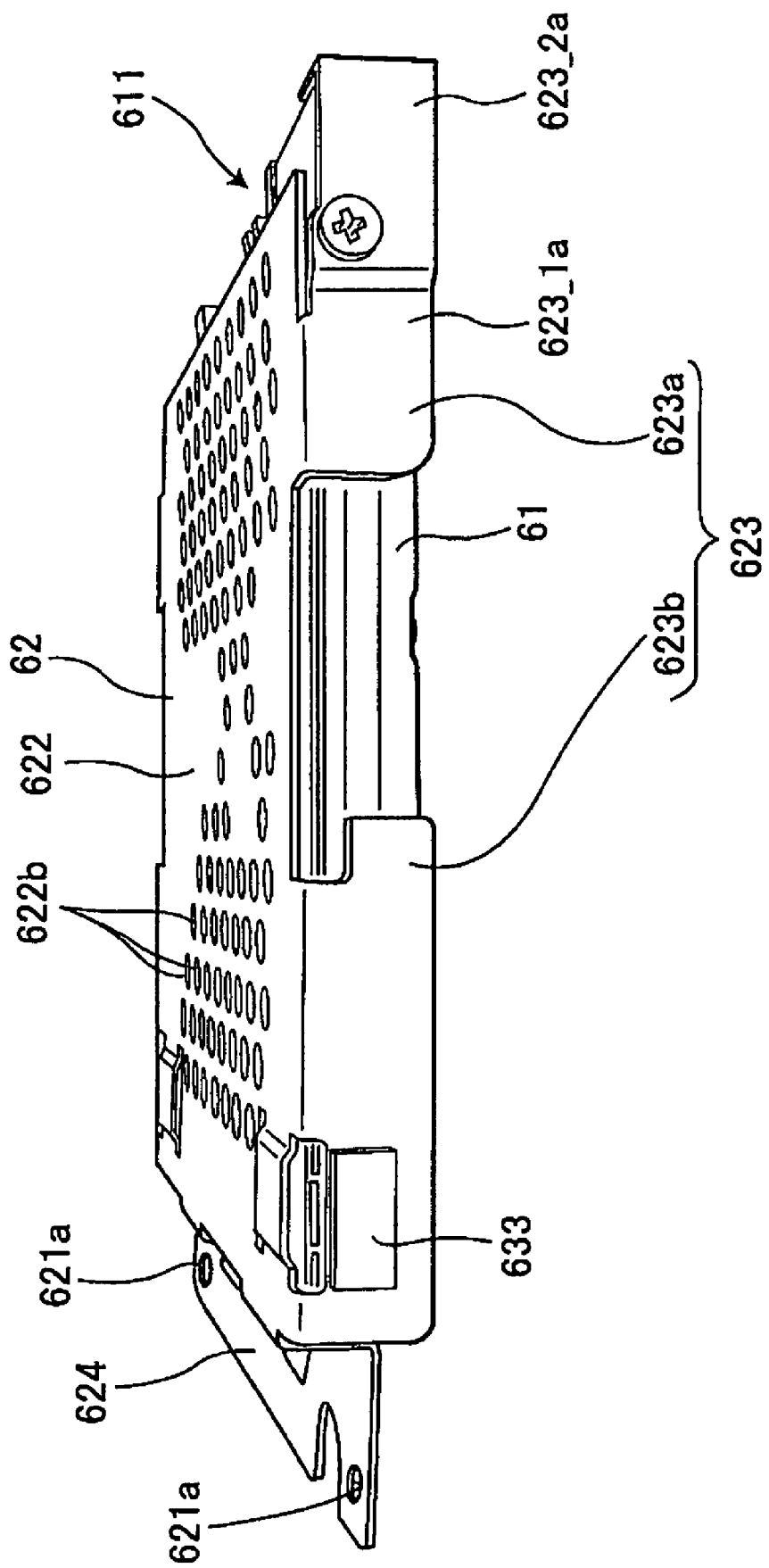
FIG. 25 is a perspective view of the mounting metal fitting attached to the HDD main body, one side surface being viewed, with the front end surface positioned on the right-hand side.
Figure 26:
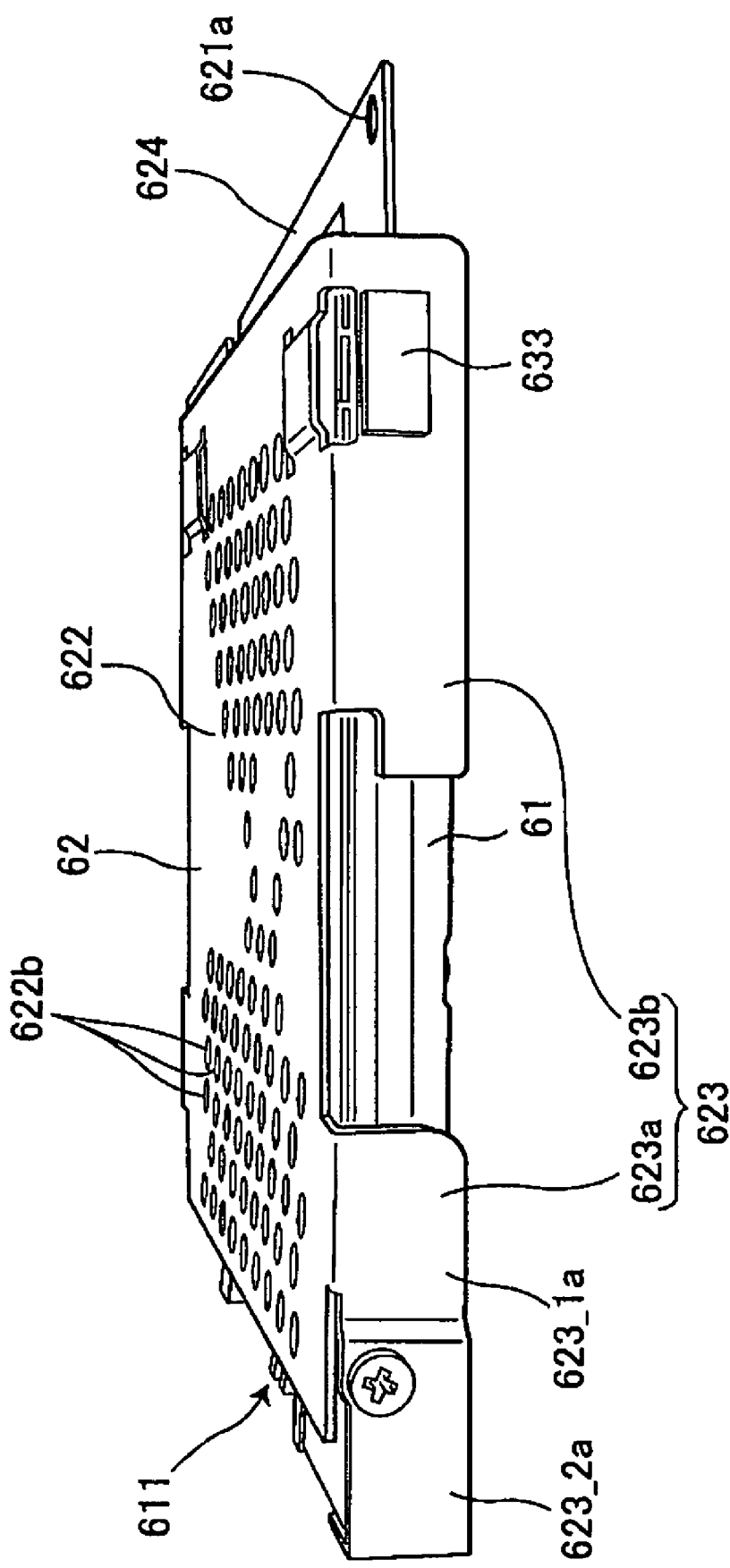
FIG. 26 is a perspective view of the mounting metal fitting attached to the HDD main body, the other side surface being viewed, with the front end surface positioned on the left-hand side.

FIGS. 25 and 26 are perspective views of the mounting metal fitting attached to the HDD main body, showing one side surface and the other side surface respectively, as viewed with the front end surface of the mounting metal fitting positioned on the right-hand side and on the left-hand side of the drawings, respectively. FIG. 27 is a perspective view of the mounting metal fitting attached to the HDD main body, as viewed from an angle at which an overview of the whole structure can be obtained.

This mounting metal fitting 62 is formed by sheet metal working. The mounting metal fitting 62 has a base portion 622 that extends to cover the top surface 614 of the HDD main body 61, and a pair of right and left side surface supporting portions 623 that are bent and extend respectively along the two side surfaces 613 of the HDD main body from the base portion 622. The right and left side surface supporting portions 623 each branch into a front end side surface supporting portion 623a and a rear end side surface supporting portion 623b.

The front end side surface supporting portion 623a is connected to the base portion 622, and has a bent portion 623_1a that is bent from this base portion 622 along the side surface 613 of the HDD main body 61 and an arm portion 623_2a that is separated from the base portion 622, connected to the bent portion 623_1a, extends along the side surface 613 of the HDD main body 61 to the front end surface 611 side, extends up to a corner where the side surface 613 of the HDD main body 61 meets the front end surface 611 thereof, and is further bent to the front end surface 611 side so as to cover the end portion of the front end surface 611. The screw insertion hole 627 for screwing (see FIG. 23) is provided in this arm portion 623_2a, and the arm portion 623_2a is fixed to the HDD main body 61 by use of a screw member 42.

In a position closer to the rear end surface 612 of the HDD main body 61 than the front end side surface supporting portion 623a, the rear end surface side side-supporting portion 623b is connected to the base portion 622 independently of the front end side surface supporting portion 623a, and is bent from the base portion 622 along the side surface 613 of the HDD main body 61 and expands along the side surface 613. Upon an inner surface of this rear end surface side side-supporting portion 623b, there is disposed the cushion member 632 that provides cushioning to the side surface 613 of the HDD main body 61.

Thus, this mounting metal fitting 62 is supported by the cushion members 631, 632 on the rear end surface side of the HDD main body 61 and is screwed in two places in total, one each on the right and left sides, only on the front end surface side. In conventional techniques, for example, screwing is performed on both of the rear end surface side and the front end surface side of the side surface 613 of the HDD main body 61 and both on the right and left sides, i.e., in four places in total. In this embodiment, however, screwing is performed only in the two places of the front end surface side and the mounting metal fitting 62 is supported by the cushion members 631, 632 on the rear end surface side and, therefore, the transmission of the vibration between the HDD main body 61 and the outside is effectively suppressed. Furthermore, in this embodiment, screwing is performed in the arm portion 623_2a of the front end side surface supporting portion 623a and vibrations are absorbed also by this arm portion 623_2a.

Incidentally, this mounting metal fitting 62 is formed so as to be shearable among HDD main bodies having different thicknesses. The above-described cushion member 631 is configured to be caused to adhere to the mounting metal fitting 62 with an adhesive sheet, and the cushion member 631 is selected according to the thickness of an HDD main body to be mounted, whereby the HDD main body is attached to the mounting metal fitting 62. Therefore, no matter what HDD main body is selected, it is possible to mount the HDD main body so as to be kept horizontal.

A large number of holes 622b are provided in the base portion 622 of this mounting metal fitting 62. These holes 622b are intended for achieving weight savings at such a level that does not impair the magnetic shielding, which is one of the roles of this base portion 622.

Furthermore, this mounting metal fitting 62 has a flanged portion 624 that is connected to the base portion 622, is bent from the base portion 622 so as to extend along the rear end surface 612 of the HDD main body 61, and further bent in the reverse direction to extend parallel to the base portion 622. This flanged portion 624 is intended for fixing the HDD unit 60, in which this mounting metal fitting 62 is attached to the HDD main body 61, to the HDD loading section 150 (see FIG. 22) provided in the cabinet of the main unit 10, and is provided with the above-described screw insertion holes 621*a*.

As shown in FIG. 22, a connector 151 is provided at a front end of the HDD loading section 150. In loading the HDD unit 60 into the HDD loading section 150, the connector 611*a* (see FIG. 27) on the front end surface 611 of the HDD main body 61 is fitted into the connector 151 at the front end of the HDD loading section 150 in such a manner that the undersurface 615 of the HDD main body 61 faces the bottom surface side of the HDD loading section 150, and the HDD unit 60 is fixed to the cabinet of the main unit 10 by use of a screw member with the aid of a screw insertion hole 621*a* provided in the flanged portion 624 of the mounting metal fitting 62.

Figure 28:
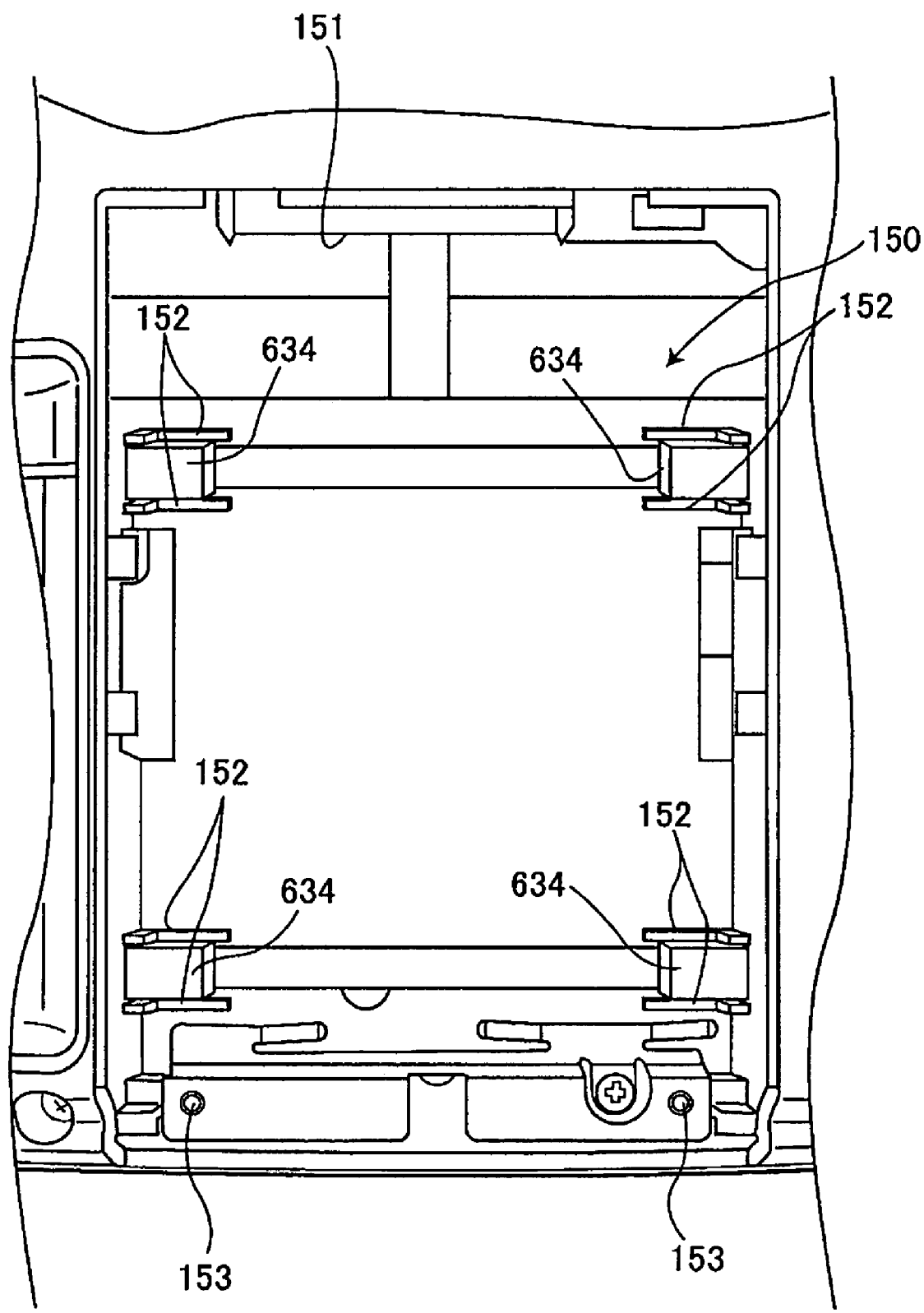
FIG. 28 is a view showing the HDD loading section from which the HDD unit is removed.
Figure 29:
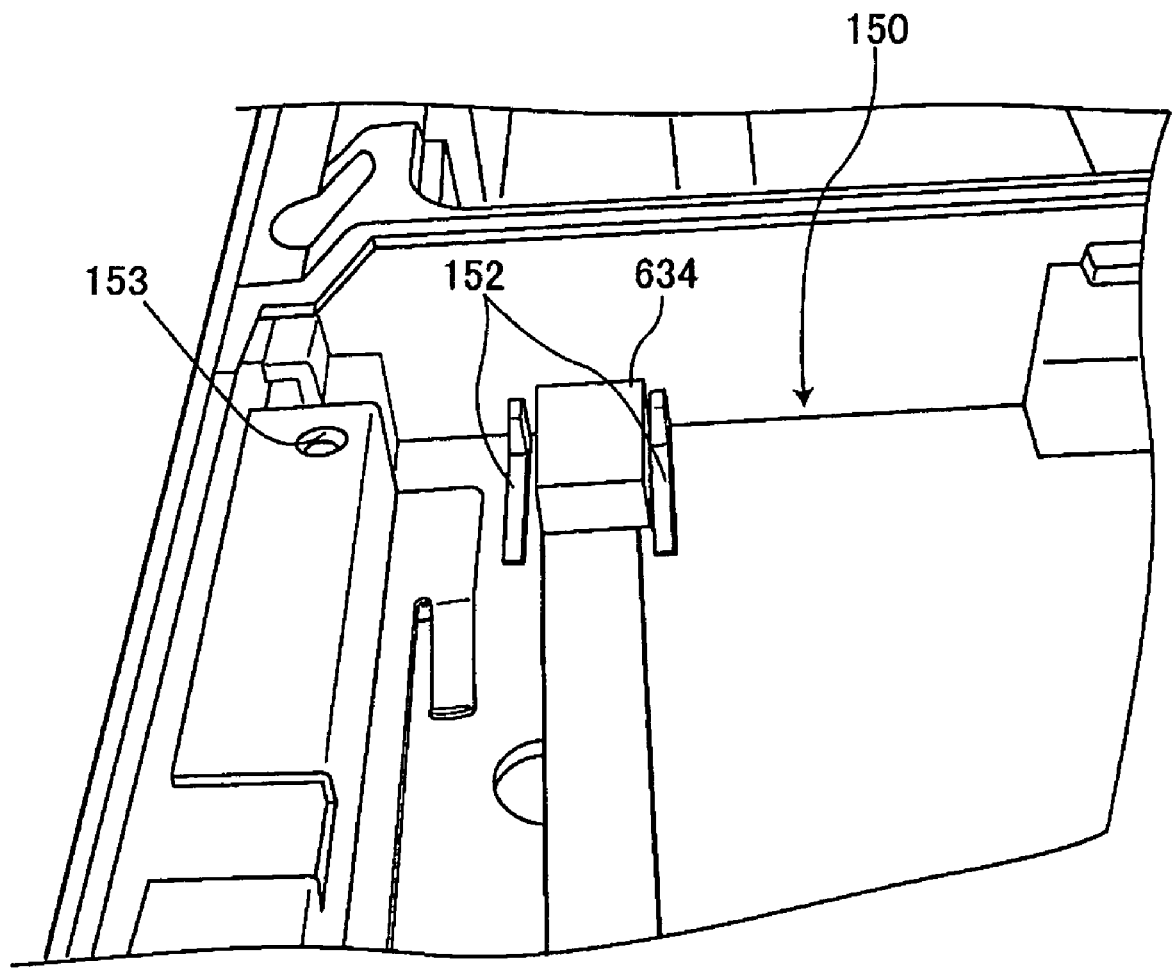
FIG. 29 is a partially enlarged view of part of the HDD loading section.

FIG. 28 is a view showing the HDD loading section from which the HDD unit was removed and FIG. 29 is a partially enlarged view of part of the HDD loading section.

This HDD loading section 150 has an opening on the bottom surface of the main unit and has a shape of a scraped-out interior. The front end of this HDD loading section 150 is provided with a connector 151 that mates with the connector 611*a* (see FIG. 27) of the HDD unit 60.

Upon the bottom surface of this HDD loading section 150, there are formed pairs of positioning ribs 152 in four places. When the HDD unit 60 is loaded into the HDD loading section 150, the sides of the mounting metal fitting 62 are position-controlled by the positioning ribs 152. A total of four cushion members 634 are disposed in positions sandwiched between the pairs of positioning ribs 152. As shown in FIG. 29, the cushion member 634 has a volume higher than the part of the positioning rib 152 that faces the undersurface 615 of the HDD main body 61. Therefore, the HDD main body 61 is loaded into the HDD loading section 150, with the undersurface 615 of the HDD main body 61 present on the four cushion members 634. Between the HDD unit 60 and the side surfaces of the HDD loading section 150, the cushion members 633 fixed to the outer walls of the rear end surface side side-supporting portion 623 of the mounting metal fitting 62 are placed.

In the rear end edge of the HDD loading section 150, when the HDD unit 60 is loaded into the HDD loading section 150, there are formed two screw holes 153 in positions through which the screw insertion holes 621*a* of the flanged portion 624 of the mounting metal fitting 62 of the HDD unit 60 are connected. The HDD unit 60 is fixed to the cabinet of the HDD unit 60 by use of screw members through these screw insertion holes 621*a* and screw holes 153.

As described above, on the right and left side surfaces of the HDD main body 61, the mounting metal fitting 62 is fixed by use of screws only in two places in total, one each on the right and left sides near the front end surface, and the rear end surface side of the HDD main body 61 is supported by the mounting metal fitting 62 via the cushion members 631, 632. For this reason, the HDD main body 61 has high allowable levels of vibration for the mounting metal fitting 62. This HDD main body 61 has a mechanically vibrating part inside of which a head moves above a rotating a hard disk (HD), which is a storage medium, to make access. Therefore, the HDD main body 61 itself generates vibration and is apt to malfunction when it receives vibration from the outside. In this embodiment, the HDD main body 61 has high allowable levels of vibration for the mounting metal fitting 62 owing to the above-described structure and, therefore, the transmission of vibration is substantially suppressed. Furthermore, also between the HDD unit 60 and the HDD loading section 150, there are provided the four cushion members 634 on the bottom surface of the HDD loading section 150 and the two cushion members 633 on the rear end side of the right and left side surfaces of the HDD unit 60, whereby allowable levels of vibration are raised.

Therefore, with this structure, mechanical vibration is less apt to be transmitted between the cabinet of the main unit 10 and the HDD main body 61, malfunctions of the HDD main body 61 due to the impact and vibration from the outside are suppressed, and the adverse effect of the vibration of the HDD main body 61 on other parts is also suppressed.

(Electronic Part Mounting Structure)

Figure 30:
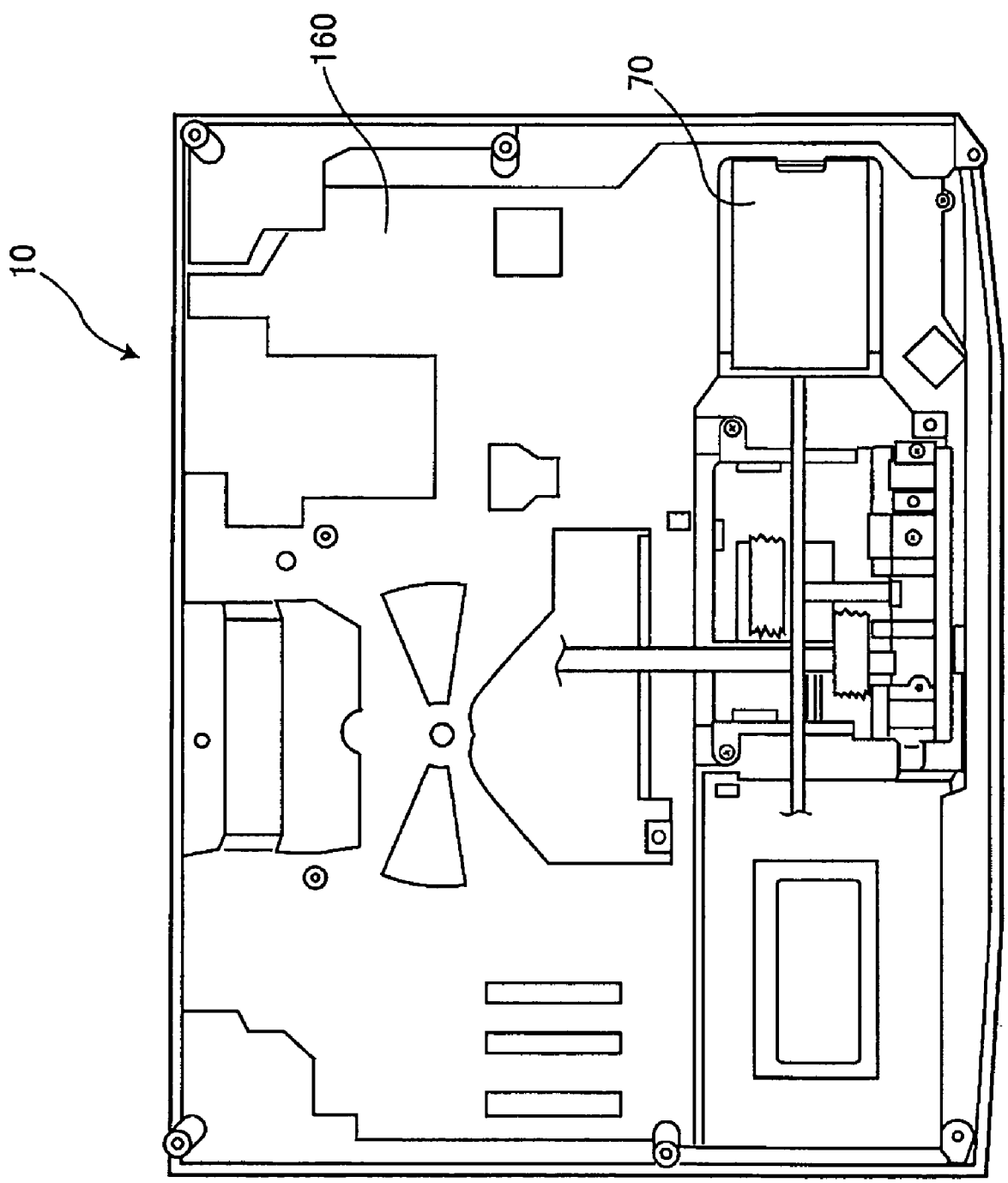
FIG. 30 is a diagram showing a shield plate that extends under a keyboard and the like constituting the top surface of the main unit, the keyboard and the like being removed.

FIG. 30 is a diagram showing a shield plate that extends under the keyboard 11 (see FIG. 1) and the like constituting the top surface of the main unit 10, with the keyboard and the like being removed. This shield plate 160 is formed by sheet metal working.

A description will be given here of a mounting structure of a plate-like electronic part 70 using this shield plate 160.

Figure 31:
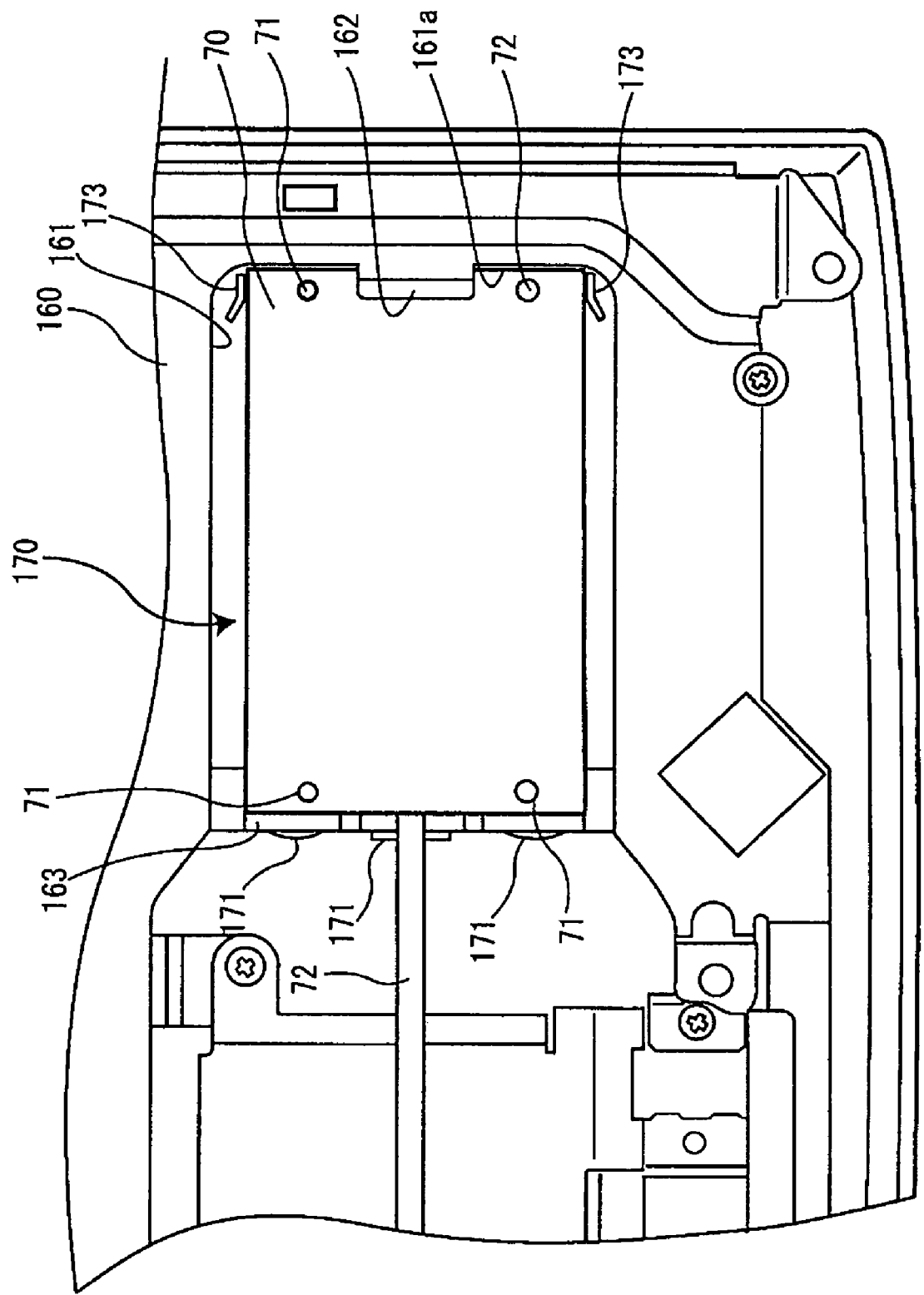
FIG. 31 is an enlarged diagram showing the area of the electronic part in FIG. 30.
Figure 32A:
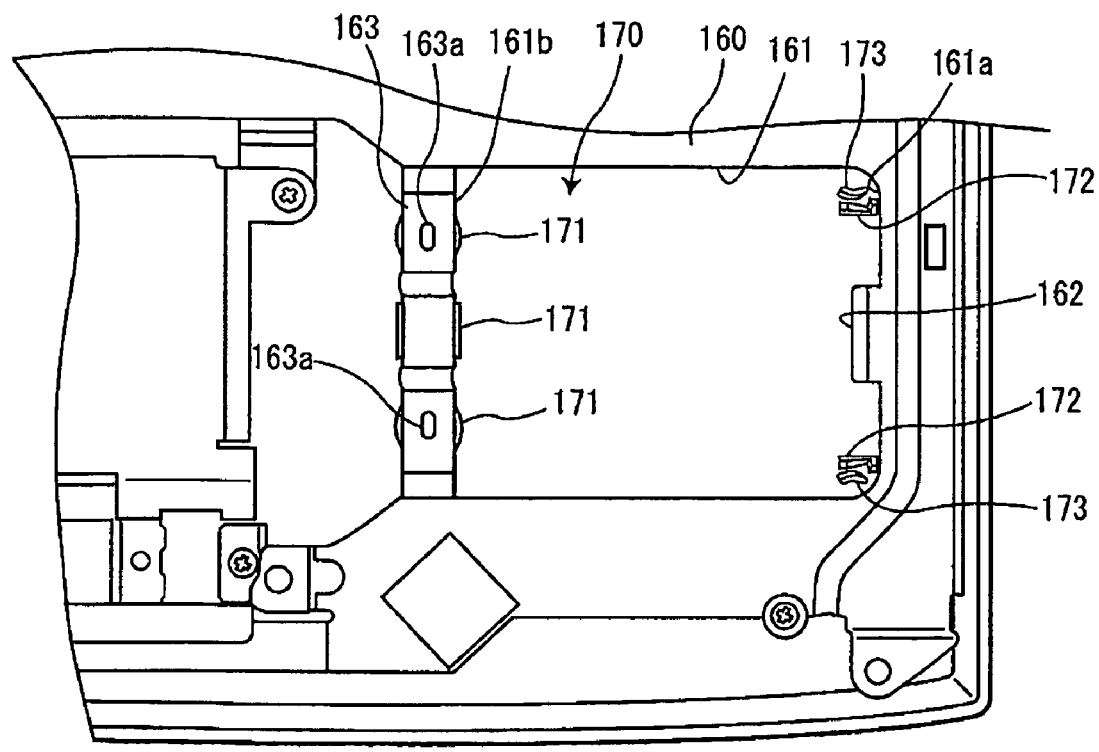
FIGS. 32(A) to 32(C) are diagrams of the same area of FIG. 31, showing an electronic part arrangement region where the electronic part is to be arranged, and the electronic part being removed.
Figure 32B:
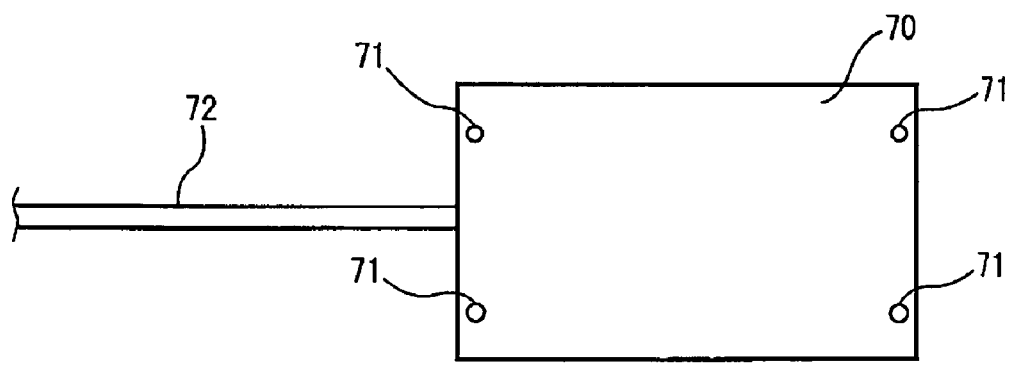
Figure 32C:
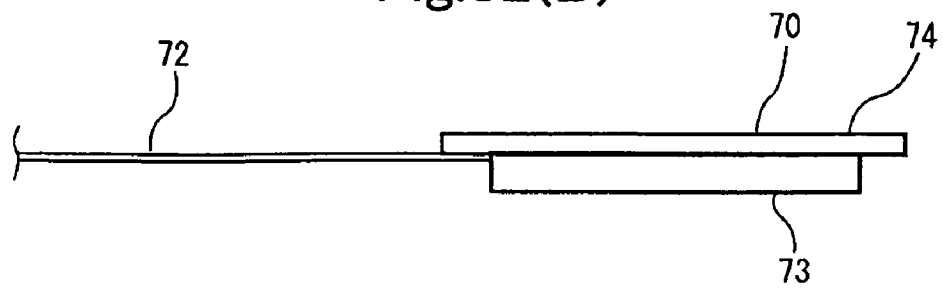

FIG. 31 is an enlarged diagram showing the area of the electronic part in FIG. 30, and FIGS. 32(A) to 32(C) are diagrams of the same area of FIG. 31, showing an electronic part arrangement region where the electronic part is to be arranged, with the electronic part being removed. FIG. 32(A) is a plan view of the electronic part arrangement region, FIG. 32(B) is a plan view of the electronic part, and FIG. 32(C) is a front view of the electronic part.

This electronic part 70 is an electronic part in which a communication circuit is built and has a rectangular shape as shown in FIG. 32(B). However, in the thickness direction, as shown in FIG. 32(C), the electronic part 70 is composed of a communication module 73 and a supporting plate 74 that is fixed to the communication module 73 and that has an area wider than that of the communication module 73. Screwing through holes 71 are formed in the four corners of the supporting plate 70, and a cable 72 that assumes the role of signal transmission to and from the outside of this electronic part 70 extends from the communication module 73.

On the other hand, in the electronic part arrangement region 170 in which this electronic part 70 is to be arranged, an opening 161 is provided in the shield plate 160 and an overhanging piece 162 that hangs over into this opening 161 is provided in a front end edge 161*a* of this opening 161 (the end edge on the right side of FIGS. 31 and 32). The rear end of the opening 161 is divided by a strip-shaped portion 163, which is formed by part of the shield plate 160 that extends like a strip, and a rear end edge 161*b* of the opening 161 is formed by the strip-shaped portion 163. The strip-shaped portion 163 of this shield plate 160 is supported from below by three bosses 171, which are provided in a standing manner in the inner wall of the bottom surface of the cabinet of the main unit 10 (see FIG. 1). A screw hole (not shown) is formed in each of the bosses on both sides among these three bosses 171, in the middle portion of the boss. A screw insertion hole 163*a* is formed in each part of the strip-shaped portion 163 of the shield plate 160 such that the screw insertion hole 163*a* overlaps with the above screw hole.

These screw holes and screw insertion holes 163*a* are formed in positions such that they overlap with the two through holes provided on the rear end side, of the four through holes 71 formed in the electronic part 70, when the electronic part 70 is placed in this electronic part arrangement region 170. The two through holes 71 on the front end side of this electronic part 70 are not used here.

As described above, the overhanging piece 162 that hangs over into this opening 161 is provided in the shield plate 160. This hanging-over piece 162 assumes the role of supporting the top surface of the electronic part 70. However, because this hanging-over piece 162 hangs over into the opening 161, this hanging-over piece 162 becomes an obstacle when the electronic part 70 is placed from above. Furthermore, even if this electronic part 70 is to be placed by being caused to slide laterally in such a manner that the front end of the electronic part 70 comes under the overhanging piece 162, this communication module 73 may strike the strip-shaped portion 163 of the shield plate 160, because this electronic part 70 has such a shape that, as shown in FIG. 32(C), only the front end portion and the rear end portion are thin and the middle portion is thick by having the communication module 73 fixed thereto. Therefore, it is considerably difficult to dispose this electronic part 70 by causing the electronic part 70 to slide laterally. Accordingly, in this embodiment, the following configuration is contrived.

Figure 33:
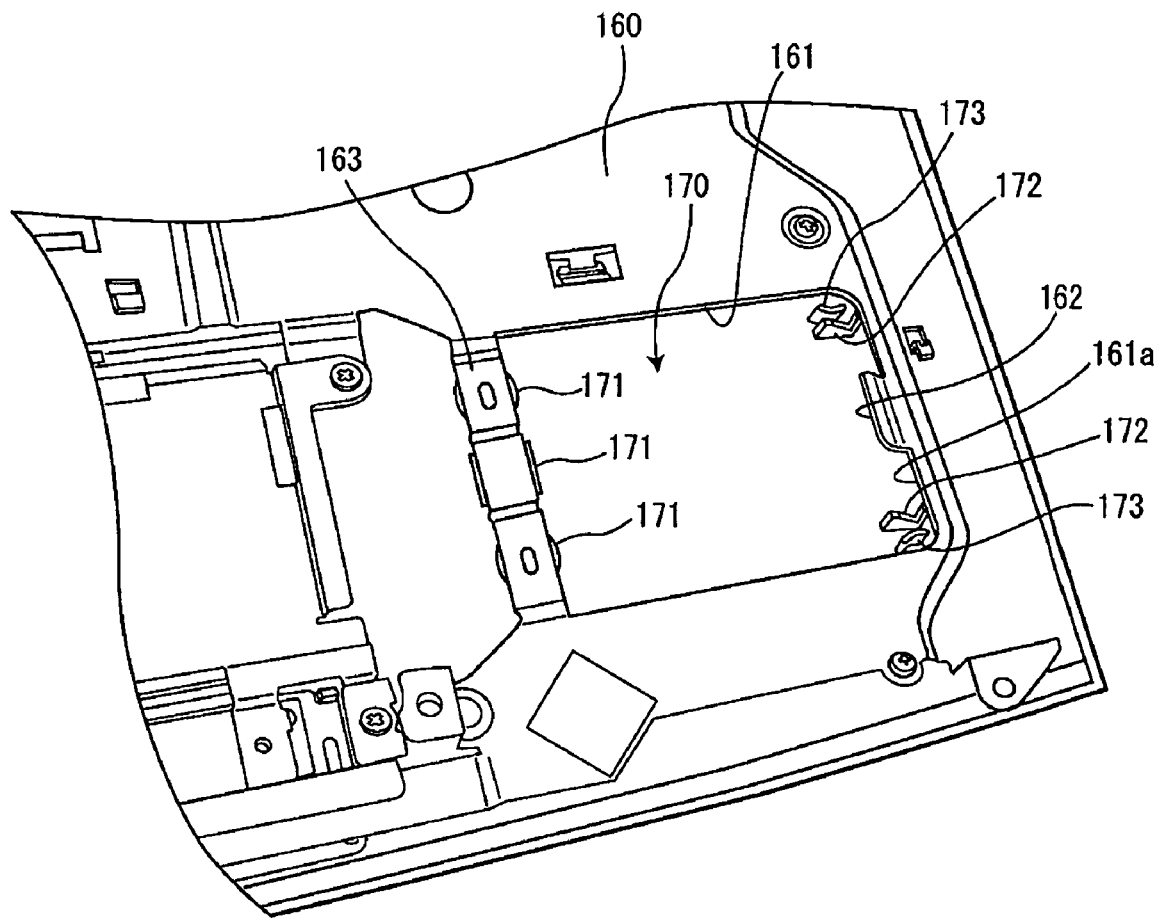
FIG. 33 is a perspective view of the electronic part arrangement region as obliquely viewed from above.
Figure 34:
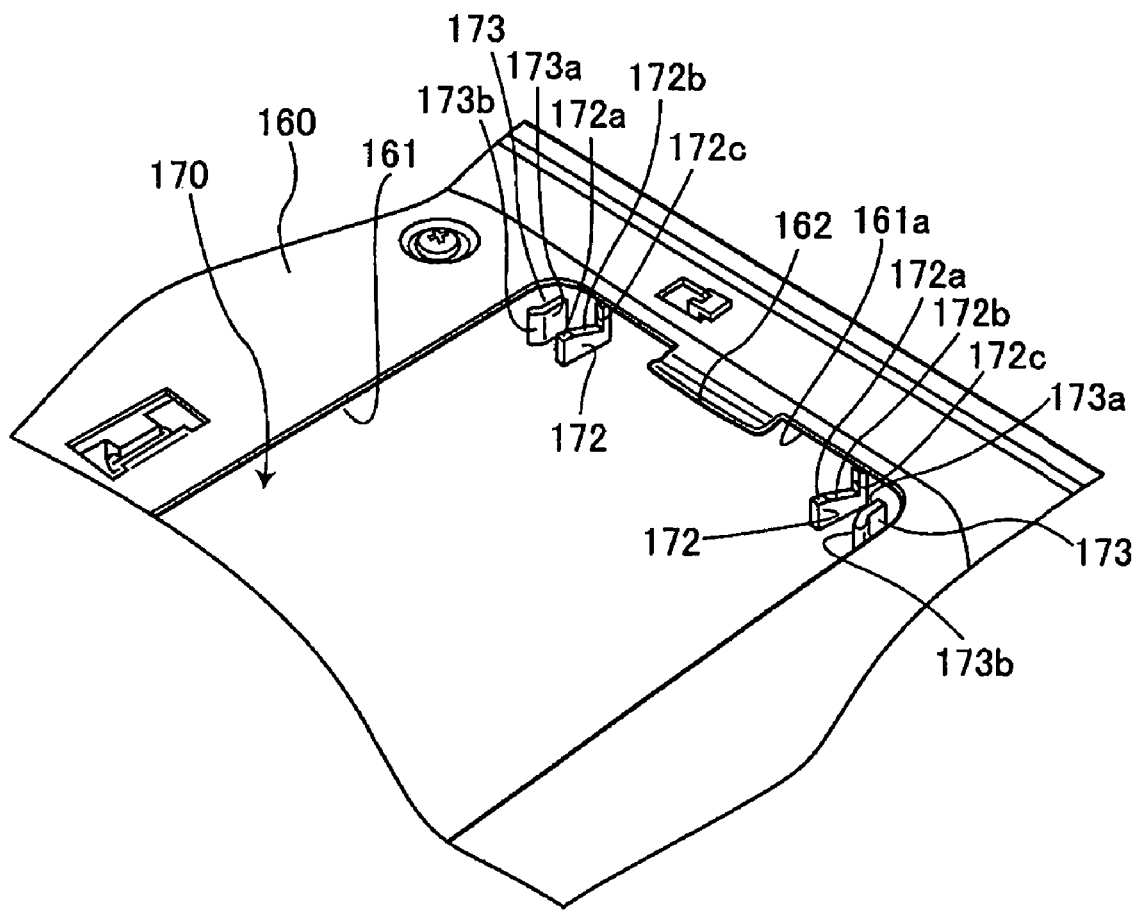
FIG. 34 is an enlarged view of a front end portion of the electronic part arrangement region.

FIG. 33 is a perspective view of the electronic part arrangement region as obliquely viewed from above and FIG. 34 is an enlarged view of a front end portion of the electronic part arrangement region.

In the front end portion of this electronic part arrangement region 170, undersurface guiding ribs 172 provided in a standing manner from the inner wall of the bottom surface of the cabinet are disposed on both sides of the overhanging piece 162 and side surface guiding ribs 173 provided in a standing manner from the inner wall of the bottom surface of the cabinet are further disposed in positions where these two undersurface guiding ribs 172 are interposed.

The top surface of the undersurface guiding rib 172 is composed of a support surface 172a and an inclined surface 172b, and an abutment wall 172c is formed in a position at the base of this inclined surface 172b.

This inclined surface 172b is an inclined surface that inclined downward to the front end edge 161a of the opening 161, and guides the front end undersurface of the electronic part 70 when the electronic part 70 is inserted obliquely downward to the front end edge 171a.

The support surface 172a is formed adjacent to the inclined surface 172b at a position more spaced from the front end edge 161a than the inclined surface 172b, and supports the front end undersurface of the electronic part 70 when the electronic part 70 is made horizontal by lowering the rear end side of the electronic part 70 that is guided to the inclined surface 172b and inserted obliquely downward. When the undersurface of the electronic part 70 is supported by this support surface 172a and the electronic part 70 is placed horizontally, the top surface of this electronic part 70 on the front end side is supported by the overhanging piece 162.

Furthermore, the abutment wall 172c is intended for receiving abutment by the front end of the electronic part 70 that is guided to the inclined surface 172b and inserted obliquely downward and performing positioning of this electronic part 70 in the fore-and-aft direction.

The hanging-over piece 162 has such a shape that the front end thereof is bent obliquely upward, and thus aids to insert the electronic part 70 obliquely downward.

The side surface guiding ribs 173 are intended for guiding the two right and left side surfaces on the front end side of the electronic part 70 inserted obliquely downward to the front end edge 161a of the opening 161, and have guide walls 173a, which extend parallel to each other due to the pair of side surface guiding ribs 173, and introduction walls 173b, which are formed at a position more spaced than the guide walls 173a from the front end edges 161a of the opening 161 and open mutually toward a direction spaced from the front end edges 161a.

The guide walls 173a are intended for controlling the lateral direction of the electronic part 70 by guiding the sides of the electronic part 70 to correct positions, and the introduction walls 173b are intended for delivering the electronic part 70 to the guide walls 173a while correcting the lateral positions of the side surfaces of the electronic part 70, which has been inserted into a position somewhat laterally shifted, by guiding the side surfaces of the electronic part 70.

Figure 35:
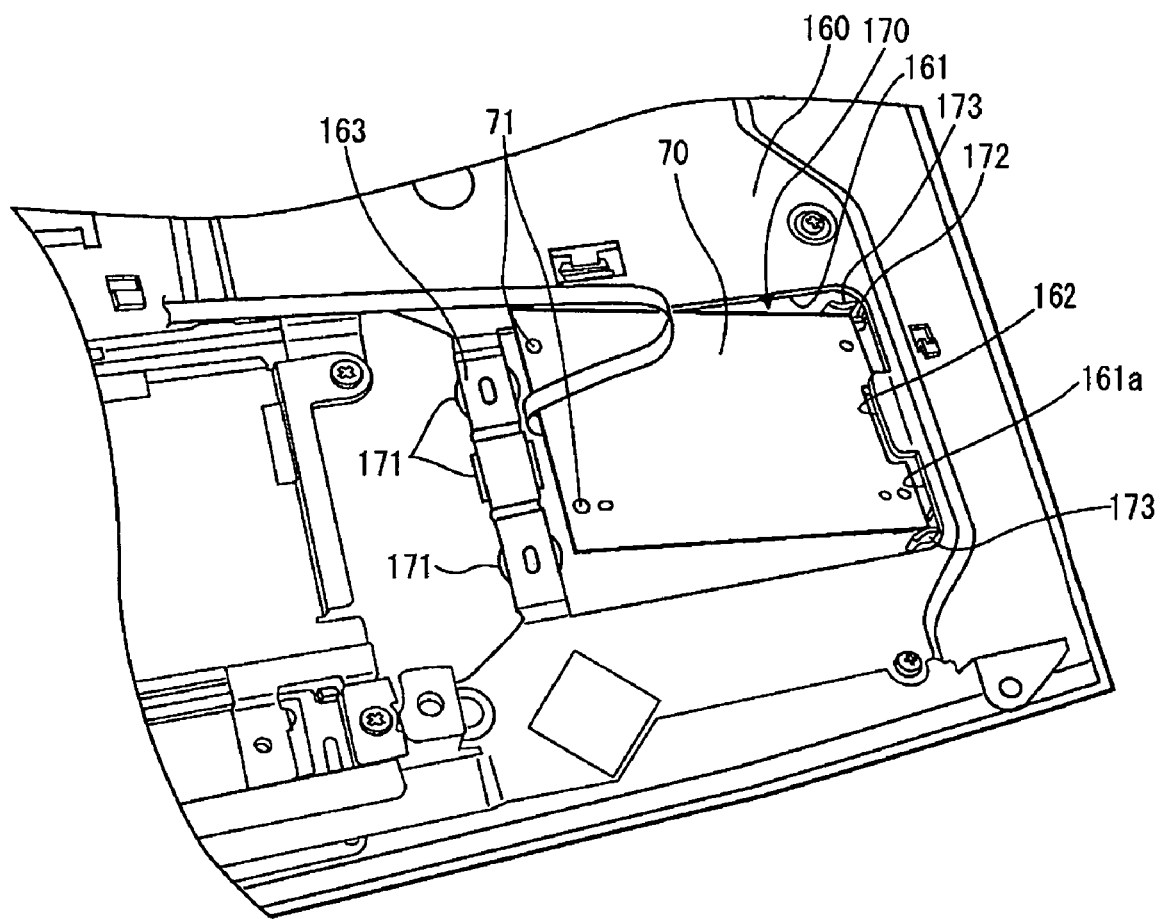
FIG. 35 is a view showing the electronic part inserted obliquely into the electronic part arrangement region.
Figure 36:
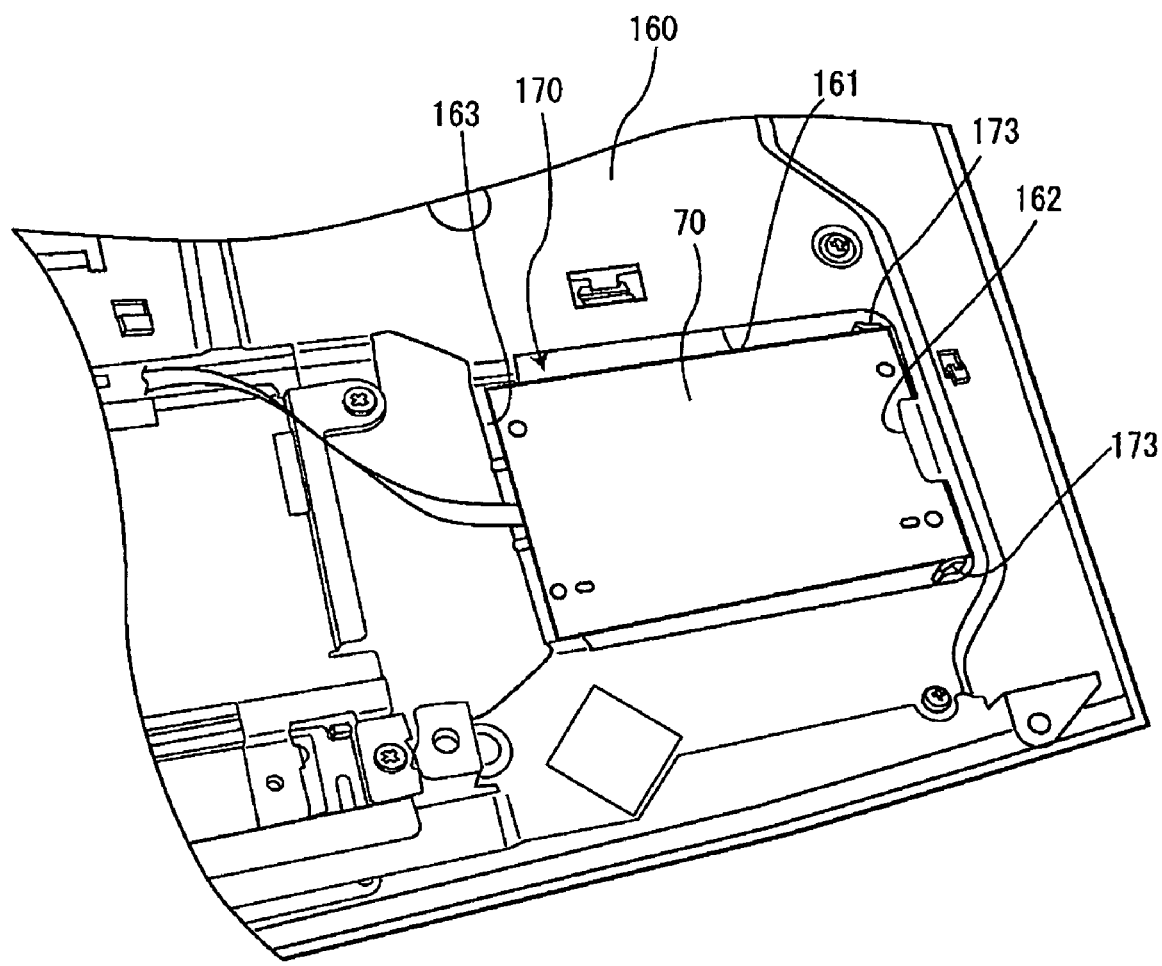
FIG. 36 is a view showing the inserted electronic part that is horizontally placed.

FIG. 35 is a view showing the electronic part inserted obliquely into the electronic part arrangement region and FIG. 36 is a view showing the inserted electronic part that is horizontally placed.

In this embodiment, for the lateral direction of the electronic part 70, the electronic part 70 inserted obliquely downward is guided with the aid of the inclined surfaces 172b of the undersurface guiding ribs 172 while performing position control with the aid of the side surface guiding ribs 173 and the front end of the electronic part 70 is caused to abut against the abutment wall 172c, whereby the fore-and-aft positions are determined. Thereafter, the electronic part 70 is horizontally placed, whereby for the front end side of the electronic part 70, the undersurface is caused to be supported by the support surfaces 172a of the undersurface guiding ribs 172 and the top surface is caused to be supported by the overhanging piece 162. In this condition, screwing to the bosses that stand on the bottom surface of the cabinet is performed with the aid of the through holes 71 on the rear end side of the electronic part 70.

As described above, in this embodiment, the electronic part 70 inserted obliquely downward is guided by providing the undersurface guiding ribs 172 and, therefore, it is possible to easily dispose the electronic part 70 in a correct place in the electronic part arrangement region 170 which improves assembling efficiency.

What is claimed is:
1. An electronic device comprising:
a first cabinet; and
a second cabinet that is supported via a pivot of the first cabinet and is capable of being closed in a closed state in which the second cabinet is closed to overlap with the first cabinet and is capable of being opened in an opened state in which the second cabinet is opened disengaged from the first cabinet,
wherein the second cabinet comprises a locking module including a hook, an operation member and a linking mechanism, the hook being provided at a position near a top end of the second cabinet around the center in the lateral direction of the top end when the second cabinet is opened, the hook being engaged with the first cabinet to lock the second cabinet in the closed state, the operation member disengaging the hook from the first cabinet in response to operation, the linking mechanism linking the operation of the operation member to movement of disengaging the hook, and
the second cabinet further comprises a board mounted with a camera module having an image taking lens and an imaging device and a signal processing circuit for the camera module, the board being disposed at such a position that a first portion of the board in which the signal processing circuit is mounted, overlaps with the linking mechanism, and a second portion of the board in which the camera module is mounted, is away from the linking mechanism without overlapping with the linking mechanism.

2. The electronic device according to claim 1, wherein the operation member protrudes from a top end surface of the second cabinet in the opened state and is operated in response to disengaging locking of the second cabinet in the closed state, the hook protrudes from a surface, which faces the first cabinet, of the second cabinet, and the first cabinet has an engagement hole where the hook enters in the closed state.

3. The electronic device according to claim 1, wherein the second cabinet has a photographing window from which the camera module appears at a position beside the hook.

4. The electronic device according to claim 1, wherein the second cabinet is a cabinet of a display unit in which a display panel with a display screen for displaying information is incorporated with the display screen exposed, and the locking module and the board are disposed in a position above a top end of the display panel in the opened state of the second cabinet.

5. The electronic device according to claim 1, wherein the first cabinet is a cabinet of an arithmetic processing unit that incorporates an arithmetic circuit performing arithmetic processing and has a keyboard on a top surface thereof that inputs instructions according to operations.

6. An electronic device comprising:

a first cabinet; and a second cabinet that is supported via a pivot of the first cabinet and is capable of being closed in a closed state in which the second cabinet is closed to overlap with the first cabinet and is capable of being opened in an opened state in which the second cabinet is opened disengaged from the first cabinet, wherein the second cabinet comprises a locking module including a hook, an operation member and a linking mechanism, the hook being provided at a position near a top end of the second cabinet around the center in the lateral direction of the top end when the second cabinet is opened, the hook being engaged with the first cabinet to lock the second cabinet in the closed state, the operation member disengaging the hook from the first cabinet in response to operation, the linking mechanism linking the operation of the operation member to movement of disengaging the hook, the second cabinet further comprises a board mounted with a camera module having an image taking lens and an imaging device and a signal processing circuit for the camera module, the board being disposed at such a position that a first portion of the board in which the signal processing circuit is mounted overlaps with the linking mechanism, a surface of the linking mechanism overlapping the first portion of the board is covered with a metal sheet, and the first portion of the board in which the signal processing circuit is mounted faces and overlaps with an outer surface of the metal sheet opposite to an inner surface of the metal sheet facing and covering the linking mechanism.

7. The electronic device according to claim 6, wherein the metal sheet is bent to extend over the surface of the linking mechanism overlapping with the first portion of the board and another surface next to and perpendicular to the surface.

8. The electronic device according to claim 6, wherein the board being disposed at such a position that a second portion of the board, in which the camera module is mounted, is away from the linking mechanism without overlapping with the linking mechanism.

* * * * *